(12) United States Patent (10) Patent No.: US 11,846,519 B2
Liu (45) Date of Patent: Dec. 19, 2023

(54) TRAVEL TIME DETERMINING METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventor: Yuting Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 724 days.

(21) Appl. No.: 17/004,442

(22) Filed: Aug. 27, 2020

(65) Prior Publication Data

US 2020/0393262 A1 Dec. 17, 2020

Related U.S. Application Data

(63) Continuation of application No. PCT/CN2019/091311, filed on Jun. 14, 2019.

(30) Foreign Application Priority Data

Jul. 23, 2018 (CN) .......................... 201810814290.1

(51) Int. Cl.
*G01C 21/34* (2006.01)
*G06F 18/214* (2023.01)
(Continued)

(52) U.S. Cl.
CPC ..... *G01C 21/3492* (2013.01); *G01C 21/3415* (2013.01); *G06F 18/214* (2023.01);
(Continued)

(58) Field of Classification Search
CPC ............ G01C 21/3415; G01C 21/3492; G06V 10/764; G06V 10/82; G06V 20/54; G06F 18/214
(Continued)

(56) References Cited

U.S. PATENT DOCUMENTS 9,109,895 B2 * 8/2015 Chen ........................ G01C 21/22
9,188,985 B1 * 11/2015 Hobbs ................ G01C 21/3626
(Continued)

FOREIGN PATENT DOCUMENTS

CN 102110362 A 6/2011
CN 103632542 3/2014
(Continued)

OTHER PUBLICATIONS

Chinese Office Action dated Dec. 14, 2021 in Application No. 201810814290.1 with concise English translation, (10 pages).
(Continued)

*Primary Examiner* — Atul Trivedi
(74) *Attorney, Agent, or Firm* — ARENTFOX SCHIFF LLP

(57) ABSTRACT

Aspects of the disclosure provide a method that can include obtaining a to-be-traveled target route, and determining for a first road section and a second road section adjacent to each other in any two positions starting from the first one of the plurality of road sections, a travel time of the first road section according to first state data of the first road section based on a travel time selection model and a state data prediction model, and determining second state data of the second road section after the first road section is traveled through according to the travel time under the first state data. The method can further include continuing to determine a travel time of the second road section according to the second state data based on the travel time selection model (Continued)

and the state data prediction model, until a travel time of each road section is determined.

19 Claims, 6 Drawing Sheets

(51) Int. Cl.
    *G06V 10/764*     (2022.01)
    *G06V 10/82*     (2022.01)
    *G06V 20/54*     (2022.01)

(52) U.S. Cl.
    CPC ............ *G06V 10/764* (2022.01); *G06V 10/82* (2022.01); *G06V 20/54* (2022.01)

(58) Field of Classification Search
    USPC .......................................................... 701/414
    See application file for complete search history.

(56) References Cited

U.S. PATENT DOCUMENTS

| | | | |
|---|---|---|---|
| 9,200,910 B2 * | 12/2015 | Fowe | G01C 21/34 |
| 2008/0004794 A1 | 1/2008 | Horvitz | |
| 2008/0140308 A1 * | 6/2008 | Yamane | G01C 21/3492 701/423 |
| 2010/0070171 A1 * | 3/2010 | Barbeau | G01C 21/3617 701/408 |
| 2010/0106603 A1 * | 4/2010 | Dey | G08G 1/096888 705/14.63 |
| 2010/0185388 A1 | 6/2010 | Horvitz | |
| 2012/0089322 A1 | 4/2012 | Horvitz | |
| 2012/0173136 A1 * | 7/2012 | Ghoting | G01C 21/3453 701/411 |
| 2013/0345966 A1 | 12/2013 | Horvitz | |
| 2014/0058652 A1 | 2/2014 | Duan et al. | |
| 2015/0185037 A1 | 7/2015 | Horvitz | |
| 2015/0345967 A1 * | 12/2015 | Meuleau | G01C 21/3453 701/25 |
| 2016/0334235 A1 * | 11/2016 | Gustafson | G01C 21/3492 |
| 2017/0278402 A1 * | 9/2017 | Yalla | G08G 1/096791 |
| 2023/0068356 A1 * | 3/2023 | Aggoune | G01C 21/3697 |

FOREIGN PATENT DOCUMENTS

| | | | |
|---|---|---|---|
| CN | 103745611 | 4/2014 | |
| CN | 104613974 | 5/2015 | |
| CN | 105674994 A | 6/2016 | |
| CN | 105894121 | 8/2016 | |
| CN | 106940829 | 7/2017 | |
| DE | 102013005362 A1 * | 10/2013 | ......... G06K 9/00785 |
| WO | WO-2018087551 A1 * | 5/2018 | ......... G01C 21/3446 |
| WO | WO-2023081630 A1 * | 5/2023 | ......... B60W 30/181 |

OTHER PUBLICATIONS

International Search Report dated Sep. 19, 2019 in International Application No. PCT/CN2019/091311 (6 pages).

Written Opinion dated Sep. 19, 2019 in International Application No. PCT/CN2019/091311. (3 pages).

* cited by examiner

TRAVEL TIME DETERMINING METHOD AND APPARATUS, COMPUTER DEVICE, AND STORAGE MEDIUM

RELATED APPLICATION

This application is a continuation of International Application No. PCT/CN2019/091311, filed on Jun. 14, 2019, which claims priority to Chinese Patent Application No. 201810814290.1, entitled "TRAVEL TIME DETERMINING METHOD AND APPARATUS, TERMINAL, AND STORAGE MEDIUM" and filed on Jul. 23, 2018. The entire disclosures of the prior applications are hereby incorporated by reference in their entirety.

FIELD OF THE TECHNOLOGY

Embodiments of this application relate to the field of computer technologies, including to a travel time determining method and apparatus, a computer device, and a storage medium.

BACKGROUND OF THE DISCLOSURE

With the development of Internet technologies and the popularization of mobile terminals, a navigation function is widely used in daily life. When a user intends to travel through a route, a travel time of the route may be predicted using the navigation function of a mobile terminal, so as to predict a time point at which the user reaches a destination, which brings much convenience to travel of the user.

A time point prediction model is generally used to determine a time point at which a user reaches a destination. During a model training stage, sample data of at least one sample route is obtained. The sample data includes route description data and historical travel data that correspond to the sample route. The route description data is used for describing a geographical situation of the sample route. The historical travel data at least includes a travel time of the sample route. Training is performed according to a plurality of pieces of obtained sample data, to obtain a time point prediction model. The time point prediction model may be used for predicting an estimated time of arrival of any route. In this way, when the user intends to travel through a target route, the route description data of the target route and a current time point may be inputted to the time point prediction model, and an estimated time of arrival of the target route, that is, a time point at which the user reaches the destination of the target route, is determined based on the time point prediction model.

However, in the foregoing solution, the time point prediction model is trained only according to global information of a route without considering local information of the route. As a result, based on the time point prediction model, the estimated time of arrival can be determined only according to the global information of the route, causing low accuracy of the prediction.

SUMMARY

According to the embodiments provided in this application, a travel time determining method and apparatus, a computer device, and a storage medium are provided. According to an aspect, a travel time determining method is provided. The method including obtaining, by a computer device, a to-be-traveled target route, the target route including a plurality of road sections arranged sequentially. Additionally, the method can include determining, by the computer device for a first road section and a second road section adjacent to each other in any two positions starting from a first one of the plurality of road sections, a travel time of the first road section according to first state data of the first road section based on a travel time selection model and a state data prediction model, and second state data of the second road section after the first road section is traveled through according to the travel time under the first state data. The method can further include continuing to determine, by the computer device, a travel time of the second road section according to the second state data based on the travel time selection model and the state data prediction model, until a travel time of each road section in the plurality of road sections is determined. The travel time selection model being used for determining a travel time of any road section according to state data of the any road section, and the state data prediction model being used for determining state data of a next road section of the any road section according to the state data and the travel time of the any road section.

According to another aspect, a travel time determining apparatus is provided. The apparatus can include processing circuitry that is configured to obtain a to-be-traveled target route, the target route including a plurality of road sections arranged sequentially. The processing circuitry can further be configured to determine, for a first road section and a second road section adjacent to each other in any two positions starting from the first one of the plurality of road sections, a travel time of the first road section according to first state data of the first road section based on a travel time selection model and a state data prediction model, and second state data of the second road section after the first road section is traveled through according to the travel time under the first state data. The processing circuitry can further continue to determine a travel time of the second road section according to the second state data based on the travel time selection model and the state data prediction model, until a travel time of each road section in the plurality of road sections is determined. Additionally, the processing circuitry can determine a travel time of any road section according to state data of the any road section, and the state data prediction model can be used for determining state data of a next road section of the any road section according to the state data and the travel time of the any road section.

A computer device is provided, including a memory and a processor, the memory storing computer-readable instructions, the computer-readable instructions, when executed by the processor, can cause the processor to perform the operation of obtaining a to-be-traveled target route, the target route including a plurality of road sections arranged sequentially. The processor can further perform the operation of determining, for a first road section and a second road section adjacent to each other in any two positions starting from the first one of the plurality of road sections, a travel time of the first road section according to first state data of the first road section based on a travel time selection model and a state data prediction model, and second state data of the second road section after the first road section is traveled through according to the travel time under the first state data. Further, the processor can perform the operation of continuing to determine a travel time of the second road section according to the second state data based on the travel time selection model and the state data prediction model, until a travel time of each road section in the plurality of road sections is determined. The travel time selection model can be used for determining a travel time of any road section according to state data of the any road section, and the state data prediction model being used for determining state data of a next road section of the any road section according to the state data and the travel time of the any road section.

A non-transitory computer-readable storage medium is provided, storing computer-readable instructions, the computer-readable instructions, when executed by a processor, can cause the processor to perform operations comprising obtaining a to-be-traveled target route, the target route including a plurality of road sections arranged sequentially, and determining, for a first road section and a second road section adjacent to each other in any two positions starting from the first one of the plurality of road sections, a travel time of the first road section according to first state data of the first road section based on a travel time selection model and a state data prediction model, and second state data of the second road section after the first road section is traveled through according to the travel time under the first state data. The processor can further perform the operation of continuing to determine a travel time of the second road section according to the second state data based on the travel time selection model and the state data prediction model, until a travel time of each road section in the plurality of road sections is determined. The travel time selection model being used for determining a travel time of any road section according to state data of the any road section, and the state data prediction model being used for determining state data of a next road section of the any road section according to the state data and the travel time of the any road section.

BRIEF DESCRIPTION OF THE DRAWINGS

To describe the technical solutions of the embodiments of this application more clearly, the following briefly introduces the accompanying drawings describing exemplary embodiments. The accompanying drawings in the following description show only some embodiments of this application, and a person of ordinary skill in the art may still derive other drawings from these accompanying drawings.

DESCRIPTION OF EMBODIMENTS

Figure 1A:
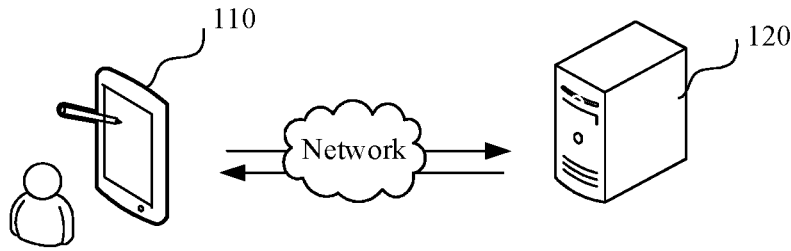
FIG. 1A is a diagram of an application environment of a travel time determining method according to an embodiment of this application.

The following describes the technical solutions in the embodiments of this application with reference to the accompanying drawings in the embodiments of this application. Of course, it should be understood that the described embodiments are exemplary embodiments of this application, rather than all of the embodiments. All other embodiments obtained by a person of ordinary skill in the art based on the exemplary embodiments of this application shall fall within the protection scope of this application.

Before the embodiments of this application are described in detail, related concepts are first described as follows:

1. Reinforcement learning framework: a reinforcement learning framework includes members such as agent, state, action, reward, value, and Markov decision process (MDP).

When a general supervised learning framework is applied to a scenario of predicting an estimated time of arrival (ETA), a prediction model is obtained through training in a training stage. The prediction model is essentially a mapping relationship between a route feature and an ETA. Through training based on sample data, the prediction model may match the sample data as much as possible and have higher accuracy. In a prediction stage, the ETA corresponding to the route feature may be obtained according to the route feature and the mapping relationship determined in the prediction model.

The reinforcement learning framework is different from the general supervised learning framework. In the reinforcement learning framework, the agent repeatedly attempts, through a feedback mechanism, to make different actions under different states, and further optimizes the feedback mechanism step by step according to a payoff obtained by making each action, to finally find, in the MDP, a decision sequence with a maximum payoff. Therefore, a training result of the reinforcement learning framework is not a numerical value, but a payoff distribution in a state-action space. In this way, when the reinforcement learning framework is applied to the scenario of predicting an ETA, an input of the reinforcement learning framework is a target route including a plurality of road sections, and an output of the reinforcement learning framework is a decided optimal policy. The optimal policy includes a travel time of each road section.

2. Road section: a road section is a minimum unit used for describing a route. One route includes a plurality of road sections. Each road section is described using a set of structured physical description data, including but not limited to, a length, a width, a quantity of included travel lights, a road grade, and the like of the road section.

3. State data of a road section: state data of a road section may include at least one of the following items:

3-1. Initial speed: an initial speed refers to a real-time travel speed of the first road section at a start point of a target route. Different road sections in the same route correspond to the same initial speed.

3-2. Historical statistical speed: a historical statistical speed is a statistical value of a travel speed of a road section at a certain time point, which is obtained by collecting statistics on historical travel data of the road section. At different time points, the same road section may have different historical statistical speeds.

3-3. Cumulative travel time: a cumulative travel time is a cumulative total travel time of one or more road sections before a current road section.

3-4. Real-time data of a road section: real-time data of a road section includes a real-time travel speed, statistical data, and physical description data.

A real-time travel speed of a road section refers to a real-time travel speed of the road section at a start point of the road section. The same road section may have different real-time travel speeds at different time points. Statistical data of a road section refers to data obtained by collecting statistics on historical travel conditions of the road section, and includes, but is not limited to a travel speed when the road section is unblocked and a plurality of historical statistical speeds within a period of time. Physical description data of a road section is used for describing a geographical situation of the road section, and includes a length, a width, a quantity of included travel lights, a road grade, and the like of the road section.

3-5. Real-time data of a remaining road section: real-time data of a remaining road section includes a real-time travel speed, statistical data and physical description data of each remaining road section after a current road section. A specific data format is similar to that of the real-time data of a road section. Details are not described herein again.

4. Action: an action refers to an action of traveling through a certain road section according to a certain travel time. An action corresponding to each road section is represented by a travel time.

Each time an action is performed, that is, after a certain road section is traveled through according to a certain travel time, the state of the agent changes. The change includes: the historical statistical speed is switched to a historical statistical speed of a next road section, a travel time of the newly traveled road section is added to the cumulative travel time, the real-time data of the road section is switched to real-time data of the next road section, and the real-time data of the newly traveled road section is removed from the real-time data of the remaining road section.

5. Immediate reward value: an immediate reward value, represented by $R_{each}$, is a reward fed back for a travel time of a road section after the road section is traveled through.

Final reward value: a final reward value, represented by $R_{finish}$, is a reward fed back for a travel time of an entire route after the route is traveled through and a destination of the route is reached.

Payoff value of state data: a payoff value of state data refers to an expected future payoff in a certain state at a certain time point. The payoff value may be used for measuring prediction accuracy of the state data. A higher payoff value indicates that a situation of being in a current state at a current time point is more consistent with an actual situation, an error is smaller, and a formulated policy is more accurate.

Payoff value of a travel time: a payoff value of a travel time refers to an expected future payoff under a condition of traveling through a current road section according to a certain travel time in a certain state at a certain time point. A higher payoff value indicates that a larger payoff is expected when the current road section is traveled through according to the travel time in a case of being in the current state at the current time point. That is, the situation is more consistent with the actual situation, an error is smaller, and a formulated policy is more accurate. According to the payoff value of the state data and the payoff value of the travel time, whether to travel through the current road section according to a formulated travel time may be determined.

6. Markov decision process: MDP <S, A, P, R, γ>, where S represents a set of state data, A represents a set of travel times, and P represents a state transition probability matrix, each element in the state transition probability matrix representing a probability of transition from a previous set of state data to a next set of state data, R represents reward, and γ represents a discount factor, and is used for calculating a cumulative payoff value.

In the scenario of predicting an ETA, a Markov decision process may be as follows:

The agent may perform n actions a in the set A when being in a state s in the set S. For each different action a, the state s is affected after the agent simulates and performs the action a, and becomes a new state s'. In this process, the agent receives an immediate reward corresponding to the action a, calculates a payoff value of the new state s', and finally chooses to perform an action having a maximum sum of the immediate reward and the payoff value among the n actions.

7. Travel time selection model: a travel time selection model is a model for determining a travel time of a road section according to state data of the road section.

8. State data prediction model: a state data prediction model is a model for predicting state data of a next road section according to state data and a travel time of a previous road section.

The state data prediction model may include at least one of a first speed prediction model and a second speed prediction model. The first speed prediction model is used for predicting, when a next road section is reached, a real-time travel speed of the next road section according to a real-time travel speed and a travel time of a current road section. The second speed prediction model is used for predicting, when a next road section is reached, a real-time travel speed of a remaining road section after the next road section according to a travel time of a current road section and a real-time travel speed of a remaining road section after the current road section.

A payoff value prediction model is a model for obtaining a payoff value according to state data. An expected future payoff in a current state is represented by using a payoff value.

A machine learning solution based on supervised learning is provided in the related art, to determine a travel time of a route. In this solution, a time point prediction model is obtained through training according to sample data of a plurality of sample routes. For a target route to be traveled through by a user, an estimated time of arrival of the target route may be determined based on the time point prediction model.

However, the sample data used in the training process can only reflect global information of the sample route. The sample route can be described from a global view, but cannot be described from a local view. That is, local information of the route is not considered during training of the time point prediction model. As a result, based on the time point prediction model, an estimated time of arrival can be determined only according to the global information of the route, while the local information of the route is lost. Therefore, the prediction is not accurate enough.

To improve the prediction accuracy, the embodiments of this application provide a solution for determining a travel time. A travel time selection model and a state data prediction model that use a road section as a unit are first obtained through training. For a target route to be traveled through by a user, a travel time of each road section is determined according to each road section in the target route based on the travel time selection model and the state data prediction model. Local information of each road section in the target route is fully considered, and the travel time of each road section is separately predicted, thereby improving the prediction accuracy.

The embodiments of this application are applied to a scenario of predicting a travel time of the target route. For example, in a scenario of map navigation, when a user intends to set out for a destination, a plurality of routes may be determined according to a current position of the user and the destination, and a travel time of each road section in each route is predicted by using the method provided in the embodiments of this application, so as to predict a total travel time of each route. The user selects a route having a short total travel time. Certainly, the embodiments of this application may be further applied to other scenarios in which a travel time of a target route needs to be predicted.

In an implementation, the terminal may be installed with a map navigation application. The method provided in the embodiments of this application may be used in the map navigation application, to predict a travel time of a target route.

FIG. 1A is a diagram of an application environment of a travel time determining method in an embodiment. Referring to FIG. 1A, the travel time determining method is applied to a travel time determining system. The travel time determining can include a terminal 110 and a server 120. The terminal 110 is connected to the server 120 by using a network. The terminal 110 may be specifically a desktop terminal or a mobile terminal, and the mobile terminal may be specifically at least one of a mobile phone, a tablet computer, a notebook computer, and the like. The server 120 may be implemented by using an independent server or a server cluster that includes a plurality of servers.

Specifically, the terminal 110 transmits a to-be-traveled target route to the server 120. The target route includes a plurality of road sections arranged sequentially. The server 120 obtains the to-be-traveled target route, and determines, for a first road section and a second road section adjacent to each other in any two positions starting from the first one of the plurality of road sections, a travel time of the first road section according to first state data of the first road section based on a travel time selection model and a state data prediction model, and second state data of the second road section after the first road section is traveled through according to the travel time under the first state data. Further, the server 120 can continue to determine a travel time of the second road section according to the second state data based on the travel time selection model and the state data prediction model, until a travel time of each road section in the plurality of road sections is determined. The travel time selection model is used for determining a travel time of any road section according to state data of the any road section, and the state data prediction model is used for determining state data of a next road section of the any road section according to the state data and the travel time of the any road section. Finally, the server 120 may return the travel time of each road section in the plurality of road sections to the terminal 110.

Figure 1:
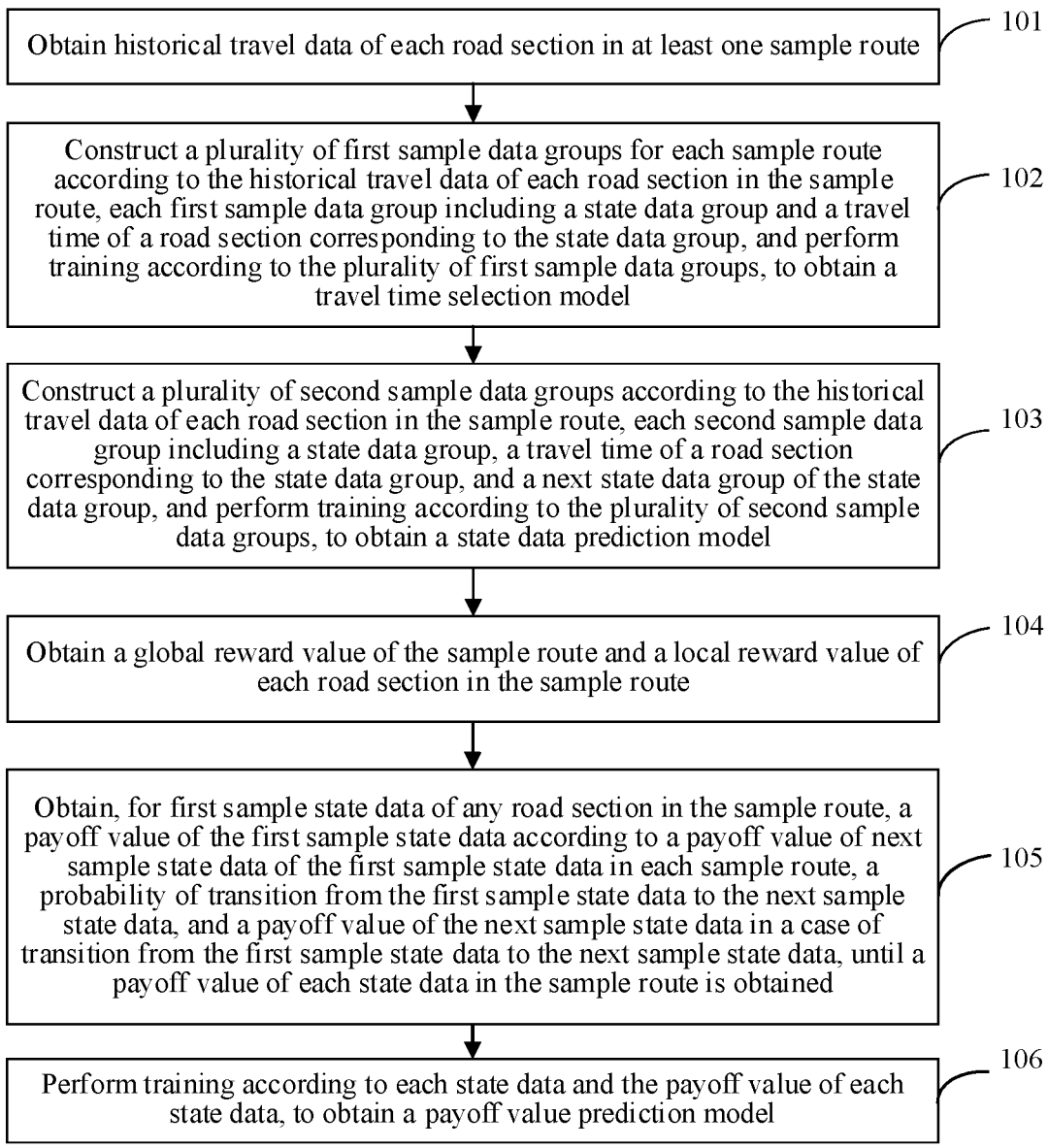
FIG. 1 is a flowchart of a model training method according to an embodiment of this application.

FIG. 1 is a flowchart of a model training method according to an embodiment of this application. The model training method can be performed by a training apparatus, and a model training process is described. The training apparatus may be a terminal with a navigation function, such as a mobile phone or a computer, a server, or the like. Referring to FIG. 1, the method includes the following steps.

In step 101, the method can obtain historical travel data of each road section in at least one sample route. Each sample route includes a plurality of road sections arranged sequentially, and historical travel data of each road section in each sample route may be collected according to a moving process of a sample device. The sample device may include devices of various types such as a mobile phone, a vehicle-mounted computer, and a tablet computer.

In a collection process, an electronic map may be obtained. The electronic map includes a plurality of road sections. In a moving process of any sample device, the sample device may be positioned, to determine a position of the sample device in real time, and historical travel data of the sample device in each road section may be collected according to the electronic map, the position of the sample device, and a corresponding time point, so that the historical travel data of each road section in a sample route may be obtained. Such a collection manner may be used for collecting historical travel data of each road section in a plurality of sample routes for a plurality of sample devices.

Historical travel data of a road section includes a travel time and state data of the road section. The travel time is a time it takes for the sample device to travel through the road section. The state data may include at least one of an initial speed, a historical statistical speed, a cumulative travel time, real-time data of the road section, and real-time data of a remaining road section, and may further include other data that can represent a current state of the sample device. For example, state data of a road section i is:

$$S_i = <V_0, V_{hts,i}, \mathrm{Tsum},i, L_i, L_{left,i}>$$

where $V_0$ represents an initial speed; that is, a real-time travel speed at a start point of a route; $V_{hts,i}$ represents a historical statistical speed of the road section i at a time point when a device, which sets off from the point of the route start currently, reaches a start point of the road section i; $T_{sum,i}$ represents a total cumulative travel time of road sections before the road section i at the time point when the device, which sets off from the start point of the route currently, reaches the start point of the road section i, that is, a sum of the travel time of each road section before the road section i; $L_i$ represents real-time data of the road section i, including a real-time travel speed, statistical data, and physical description data.

The real-time travel speed refers to a real-time travel speed of the road section i at the time point when the device, which sets off from the start point of the route currently, reaches the start point of the road section i. The statistical data includes a travel speed of the road section i when the road section i is unblocked and a plurality of historical statistical speeds within at least a period of time. The physical description data is used for describing a geographical situation of the road section i, and may include a length, a width, a quantity of included travel lights, a road grade, and the like of the section i.

Further, $L_{left,i}$ represents real-time data of each road section after the road section i, including a real-time travel speed, statistical data, and physical description data of each road section after the road section i.

The historical travel data of each road section directly collected by the training apparatus can include a time point and a travel speed of the sample device when passing a certain place. In this case, for each road section in the electronic map, the travel time of the road section may be determined according to a time point at which the sample device passes a start point of the road section and a time point at which the sample device passes an end point of the road section. In addition, each item in state data at the start point of the road section, that is, the state data of the road section, may be obtained according to the historical travel data of the road section and the historical travel data of each road section after the road section.

In step 102, the method can construct a plurality of first sample data groups for each sample route according to the historical travel data of each road section in the sample route, each first sample data group including a state data group and a travel time of a road section corresponding to the state data group, and perform training according to the plurality of first sample data groups, to obtain a travel time selection model.

The travel time selection model is used for determining a travel time of any road section according to state data of the any road section. For any road section, a travel time of the road section may be predicted based on the travel time selection model according to data of the road section.

When the historical travel data of each road section in a sample route is obtained, the state data and the travel time of the road section may be obtained, that is, a correspondence between the state data and the travel time is obtained, and the correspondence is used as a first sample data group. In this way, the plurality of first sample data groups are obtained. For example, i represents a road section, and i+1 represents a next road section, where i is an integer. State data $s_{i,t}$ of the road section i and a travel time $a_i$ of the road section i at the time point t of the start point of the road section i may be obtained according to the historical travel data.

At the beginning of training, model parameters of the travel time selection model are set to random values. Then, for each first sample data group, by using a first training algorithm, the state data in the first sample data is used as an input of the model, and the travel time in the first sample data is used as an output of the model, to perform training according to the first sample data to obtain the travel time selection model. In a subsequent process, for the next sample data group, the travel time selection model may be further trained, to improve the accuracy of the travel time selection model.

The first training algorithm may be selected from various algorithms such as a deep network training algorithm, a recurrent neural network algorithm, and a decision tree algorithm. Correspondingly, the trained travel time selection model may be selected from various algorithms such as a deep network training algorithm, a recurrent neural network algorithm, and a decision tree algorithm.

In an implementation, the travel time selection model is used for determining probabilities of a plurality of travel times according to the state data of any road section, that is, a probability distribution is determined. Each probability in the probability distribution represents a probability of traveling through the road section according to a corresponding travel time. A higher probability indicates that it is more likely to travel through the road section according to the travel time. In this case, the travel time of the road section may be determined according to the probabilities of the plurality of travel times.

In step 103, the method can construct a plurality of second sample data groups according to the historical travel data of each road section in the sample route, each second sample data group including a state data group, a travel time of a road section corresponding to the state data group, and a next state data group of the state data group, and perform training according to the plurality of second sample data groups, to obtain a state data prediction model.

The state data prediction model is used for determining state data of a next road section of any road section according to the state data and the travel time of the any road section. For any road section, state data of a next road section of the road section may be predicted based on the state data prediction model according to the state data and the travel time of the road section.

When the historical travel data of each road section in a sample route is obtained, state data at a start point of each road section, a travel time of the road section, and state data at an end point of the road section after the road section is traveled through according to the travel time may be obtained, that is, the state data of the road section and a correspondence between the travel time of the road section and state data of a next road section of the road section are obtained, and the correspondence is used as a second sample data group. In this way, a plurality of second sample data groups are obtained. For example, i represents a road section, and i+1 represents a next road section, where i is an integer. State data $s_{i,t}$ of the road section i and a travel time $a_i$ of the road section i at a time point t when the start point of the road section i is reached may be obtained according to the historical travel data. In addition, it is assumed that after the road section i is traveled through according to the travel time $a_i$, the end point of the road section i, that is, the start point of the road section i+1, is reached at a time point t+1. In this case, state data $s_{i+1,t+1}$ of the road section i+1 is obtained.

At the beginning of training, model parameters of the state data prediction model are set to random values. Ten, for each second sample data group, by using a second training algorithm, the state data and the travel time in the second sample data are used as an input of the model, and the next state data group in the second sample data is used as an output of the model, to perform training according to the second sample data to obtain the state data prediction model. In a subsequent process, for the next sample data group, the state data prediction model may be further trained, to improve the accuracy of the state data prediction model.

The second training algorithm may be selected from various algorithms such as a deep network training algorithm, a recurrent neural network algorithm, and a decision tree algorithm. Correspondingly, the trained state data prediction model may be selected from various algorithms such as a deep network training algorithm, a recurrent neural network algorithm, and a decision tree algorithm. Particularly, in one route, road section strings having topological structure features are correlated in state data. Therefore, it is more consistent with an actual situation to use the recurrent neural network algorithm, and state data transition of front and rear road sections at different time points can be learned better, thus improving the accuracy of the model.

Because a large quantity of sample routes can be obtained in the training process, and each sample route includes a plurality of road sections adjacent to each other in positions, in this way, a large quantity of pairs of road sections in adjacent positions can be obtained. Because there are too many road section combinations, if training is performed directly according to the sample data of the large quantity of road section combinations, it results in an excessively large amount of computation, which exceeds the limits of memory space and computing efficiency. In addition, it is found through observation that, a difference between the state data of the two road sections in adjacent positions only lies in real-time travel speeds of the road sections and real-time travel speeds of remaining road sections. Therefore, except such two items of the state data, all other items of the state data of the next road section may be obtained through calculation according to corresponding state data of the current road section without prediction through the model. Based on this, the model may be trained for the two items of the state data: the real-time travel speed of the road section and the real-time travel speed of the remaining road section.

In an implementation, the state data of any road section includes real-time data of the road section. The real-time data refers to the real-time travel speed of the road section.

In this case, the state data prediction model includes a first speed prediction model. The first speed prediction model is used for determining, according to the real-time travel speed of the road section at the time point of reaching the start point of the road section and the travel time of the road section, a real-time travel speed of the next road section at a time point of reaching the end point of the road section after the road section is traveled through according to the travel time.

Correspondingly, step 103 may include constructing a plurality of sample data groups according to the obtained historical travel data, each sample data group including a real-time travel speed of a road section, a travel time of the road section, and a real-time travel speed of a next road section, and performing training according to each sample data group, to obtain the first speed prediction model.

Figure 2:
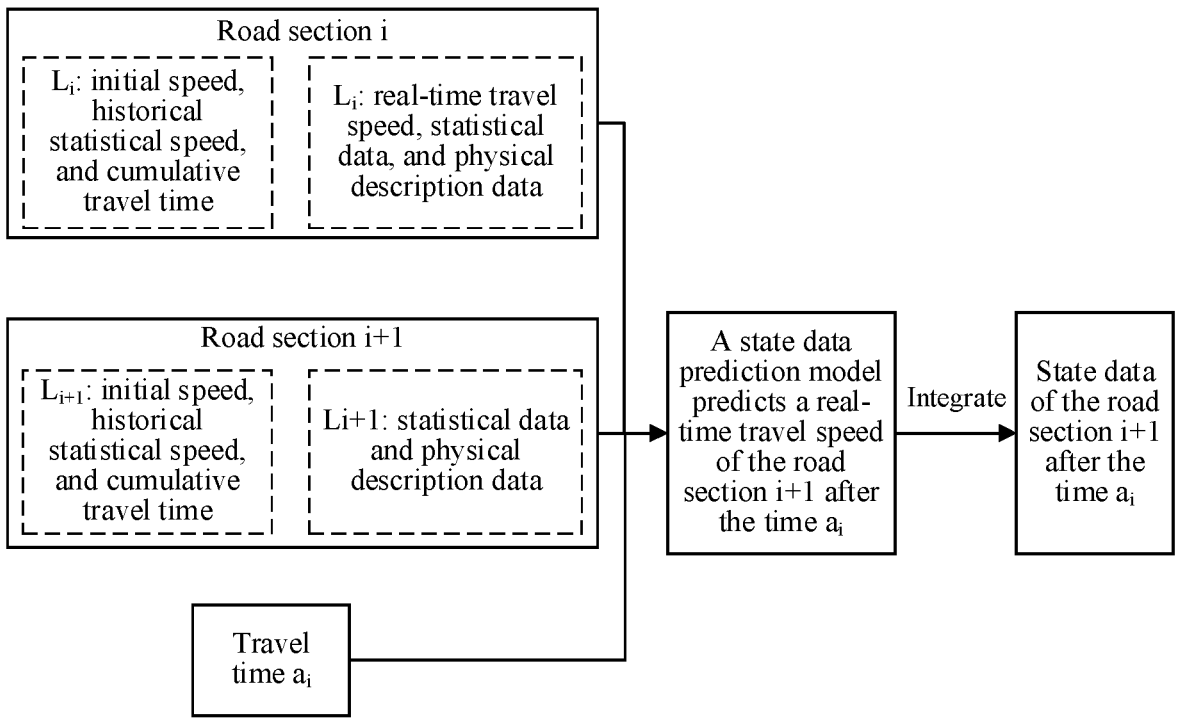
FIG. 2 is a schematic diagram of predicting a real-time travel speed according to an embodiment of this application.

Referring to FIG. 2, by setting the first speed prediction model in the state data prediction model, it can be ensured that when prediction is performed based on the state data prediction model, according to state data of any road section and items of state data, except a read-time travel speed, of a next road section, the real-time travel speed of the next road section may be predicted, so that other items of the state data of the next road section are integrated with the real-time travel speed, to obtain the complete state data of the next road section.

In another implementation, the state data of any road section includes real-time data of a remaining road section. The real-time data of the remaining road section refers to a real-time travel speed of each road section after the current road section, that is, the real-time travel speed of each road section after the current road section at the start point of the current road section. In this case, the state data prediction model includes a second speed prediction model. The second speed prediction model is used for determining, according to the real-time travel speed of each road section after the current road section at the time point of reaching the start point of the current road section and the travel time of the current road section, a real-time travel speed of each road section after the next road section at the time point of reaching the end point of the current road section after the current road section is traveled through according to the travel time.

Correspondingly, step 103 may include constructing a plurality of sample data groups according to the obtained historical travel data, each sample data group including a real-time travel speed of each road section after a road section, a travel time of the road section, and a real-time travel speed of each road section after a next road section of the road section, and performing training according to each sample data group, to obtain the second speed prediction model.

Figure 3:
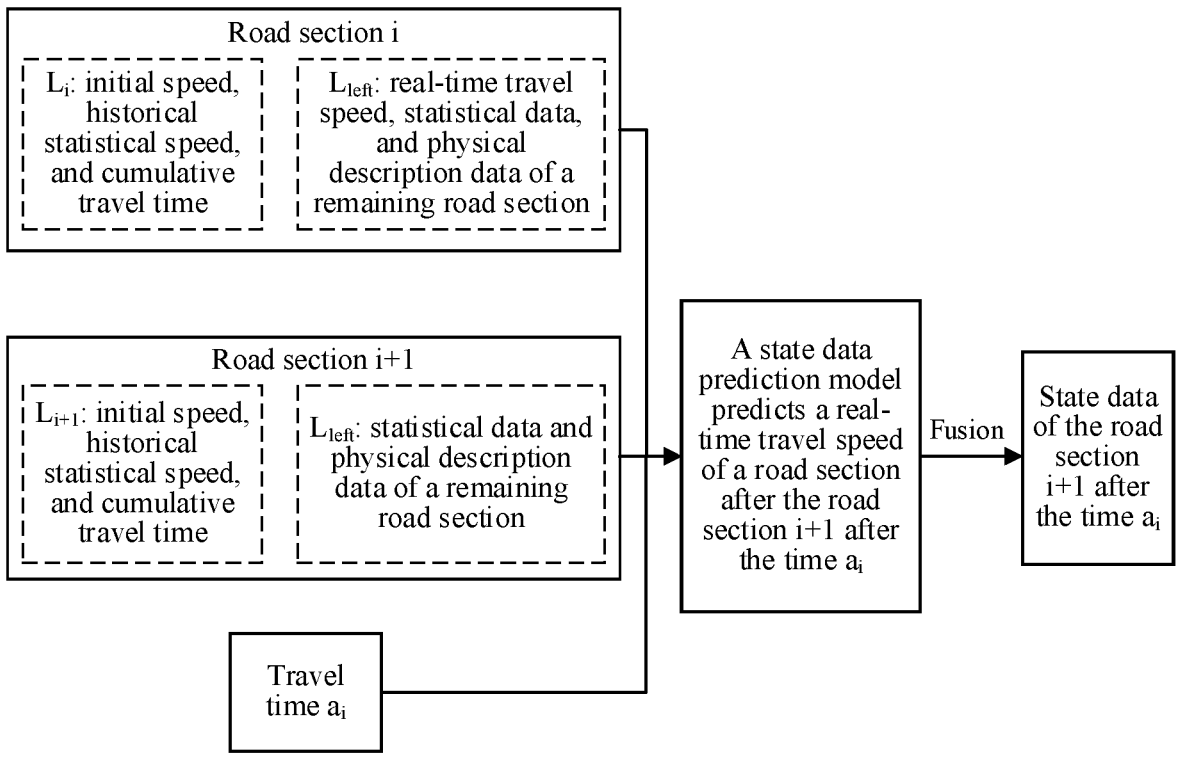
FIG. 3 is a schematic diagram of predicting a real-time travel speed of a remaining road section according to an embodiment of this application.

Referring to FIG. 3, by setting the second speed prediction model in the state data prediction model, it can be ensured that when prediction is performed based on the state data prediction model, according to state data of any road section and items of state data, except a read-time travel speed, of each road section after a next road section, the real-time travel speed of each road section after the next road section may be predicted, so that other items of the state data of the next road section are integrated with the real-time travel speed of each road section after the next road section, to obtain the complete state data of the next road section.

For other items of the state data, excluding the foregoing real-time data of the road section and the real-time data of the remaining road section, model training may not be performed. Other manners may be used in the subsequent prediction process to predict such state data.

In step 104, the method can obtain a global reward value of the sample route and a local reward value of each road section in the sample route. The global reward value is used for measuring accuracy of a travel time of the sample route. A higher global reward value indicates that a predicted travel time of the sample route is more accurate and more consistent with the actual situation. The local reward value is used for measuring accuracy of the travel time of the corresponding road section. A higher local reward value indicates that a predicted travel time of the road section is more accurate and more consistent with the actual situation.

In an implementation, step 104 may further include steps 1041 to 1043 below.

In step 1041, the method can determine a predicted travel time of each road section in the sample route based on the currently trained travel time selection model and state data prediction model. In the foregoing step 102 and step 103, the travel time selection model and the state data prediction model may be obtained through training. In this case, a predicted travel time of the road section may be determined for each road section in the sample route based on the travel time selection model according to the state data of the road section, the state data of the next road section may also be determined based on the state data prediction model according to the travel time of the road section, and the predicted travel time of each road section in the sample route may be determined in a similar way.

In an implementation, if a travel policy is formulated only according to a target of achieving an optimal value, it is likely to focus on a local optimal value while losing other chances of obtaining a maximum payoff. Therefore, to avoid the problem of local optimization, when a travel time is predicted for each road section, an optimal travel time of the road section is first determined based on the travel time selection model, and then noise is introduced with reference to other factors of the road section, to determine other travel times of the road section, for example, a suboptimal travel time, and other possible travel times. In this way, a search range can be expanded, to ensure that search is more comprehensive, so that the finally formulated travel policy is more reasonable. For example, a Monte Carlo tree search policy may be added for searching, and the concept of random sampling is used to reduce minimize a search space and improve search efficiency.

In step 1042, the method can obtain a predicted total travel time of the sample route according to the predicted travel time of each road section, and determine a global reward value of the sample route according to a first error between the predicted total travel time of the sample route and an actual total travel time of the sample route, the global reward value being inversely proportional to the first error.

A sum of the predicted travel times of all the road sections in the sample route is the predicted total travel time of the sample route. The historical travel data of the sample route includes the actual total travel time of the sample route. A greater first error between the predicted total travel time and the actual total travel time indicates that the predicted total travel time of the sample route is less accurate. Therefore, the global reward value is inversely proportional to the first error, and the global reward value may be determined according to the first error.

For example, the first error is determined according to the predicted total travel time and the actual total travel time of the sample route by using the following formula:

$$mape_{Traj} = \frac{abs(T - Traj)}{Traj}.$$

The global reward value is determined according to the first error by using the following formula:

$$R_{finish} = \alpha \times \frac{1}{mape_{Traj}}.$$

$mape_{Traj}$ represents the first error, T represents the predicted total travel time, Traj represents the actual total travel time, abs represents a function that takes an absolute value after rounding, $R_{finish}$ represents the global reward value, and $\alpha$ represents a weight coefficient.

By correlating the first error with the global reward value to make the first error inversely proportional to the global reward value, it can be ensured that the global reward value increases as the error decreases. Therefore, a payoff value is obtained through calculation according to the global reward value, to ensure that the model realizes accurate prediction of the payoff value at a road section level.

In step 1043, the method determines a local reward value of each road section according to a second error between the travel time of each road section and an actual travel time of each road section, the local reward value being inversely proportional to the second error.

The historical travel data of the sample route includes the actual travel time of each route. For each road section in the sample route, a difference between the predicted travel time and the actual travel time is the second error. A greater second error indicates that the predicted travel time of the road section is less accurate. Therefore, the local reward value is inversely proportional to the second error, and the local reward value may be determined according to the second error.

For example, the local reward value is determined according to the second error by using the following formula:

$$R_{each} = \beta \times \frac{1}{mape_{link}}.,$$

where $R_{each}$ represents the local reward value, $\beta$ represents the weight coefficient, and $mape_{link}$ represents the second error.

By correlating the second error with the local reward value to make the second error inversely proportional to the local reward value, it can be ensured that the local reward value increases as the error decreases. Therefore, a payoff value is obtained through calculation according to the local reward value, to ensure that the model realizes accurate prediction of the payoff value at a road section level.

In step 105, the method obtains, for first sample state data of any road section in the sample route, a payoff value of the first sample state data according to a payoff value of next sample state data of the first sample state data in each sample route, a probability of transition from the first sample state data to the next sample state data, and a payoff value of the next sample state data in a case of transition from the first sample state data to the next sample state data, until a payoff value of each state data in the sample route is obtained.

A payoff value of final state data in any sample route is equal to a sum of the global reward value of the sample route and the local reward value of each road section in the sample route. In this way, for each sample route, the payoff value of the final state data may be first determined according to the sum of the global reward value of the sample route and the local reward value of each road section.

For a first road section and a second road section adjacent to each other in any two positions in the sample route, a probability of a travel time of the first road section may be determined based on the travel time selection model according to state data of the first road section, and state data of the second road section may be determined based on the state data prediction model according to the state data and the travel time of the first road section. That is, the probability of transition from the state data of the first road section to the state data of the second road section is equal to the probability of the travel time of the first road section, and the payoff value of the state data of the second road section in the case of transition from the state data of the first road section to the state data of the second road section is equal to the local reward value of the first road section.

Therefore, starting from the final state data, for the first sample state data of any road section, the payoff value of the first sample state data may be obtained according to the payoff value of next sample state data, the probability of transition from the first sample state data to the next sample state data, and the payoff value of the next sample state data under the condition of transition from the first sample state data to the next sample state data, so that the payoff value of each state data in the sample route is obtained.

In an implementation, the payoff value of the first sample state data is obtained by using the following formula:

$$V^\pi(s_i) = \sum_{s_{i+1} \in S} p(s_{i+1} | s_i, a_i)[R(s_{i+1} | s_i, a_i) + \gamma V^\pi(s_{i+1})].,$$

were $s_i$ represents the first sample state data, $V^\pi(s_i)$ represents the payoff value of the first sample state data, $s_{i+1}$ represents the next sample state data, $V^\pi(s_{i+1})$ represents the payoff value of the next sample state data, S represents a set including all next sample state data of the first sample state data in the at least one sample route, and $\pi$ represents a travel policy including travel times of a plurality of road sections. $P(s_{i+1}|s_i,a_i)$ represents the probability of transition from the first sample state data to the next sample state data, and is equal to a probability of a travel time used during transition from the first sample state data to the next sample state data. $R(s_{i+1}|s_i,a_i)$ represents the payoff value of the next sample state data under the condition of transition from the first sample state data to the next sample state data, and is equal to a local reward value of a road section that is traveled through during transition from the first sample state data to the next sample state data. $\gamma$ represents a discount factor.

It can be learned from a Bellman equation that, from a current decision time point (which may be considered as a start-off time point) to a decision end time point of the whole route, the payoff value of the state data of each road section is as follows:

$$V^\pi(s) = E_\pi\left[\sum_{j=0}^{n} \gamma^j * V_{s_j} \bigg| s = s_0\right]$$

That is, it is assumed that a payoff value of state data s under a policy $\pi$ is an expectation of a cumulative sum of products of a payoff value of each subsequent step and $\gamma^j$. Using first state data s0 as an example, the formula may be as follows:

$$V^{\pi}(s) = E_{\pi}[V_0 + \gamma V_1 + \gamma^2 V_2 + \gamma^3 V_3 + \cdots \mid s = s_0]$$
$$= E_{\pi}[V_0 + \gamma E_{\pi}[V_1 + \gamma^1 V_2 + \gamma^2 V_3 + \cdots] \mid s = s_0]$$
$$= E_{\pi}[R(s_1 \mid s_0, a_0) + \gamma V^{\pi}(s_1) \mid s = s_0]$$

For any state data $s_i$, $V^{\pi}(s_i) = \Sigma_{s_{i+1} \in s} P(s_{i+1}|s_i, a_i)[R(s_{i+1}|s_i, a_i) + \gamma V^{\pi}(s_{i+1})]$.

Figure 4:
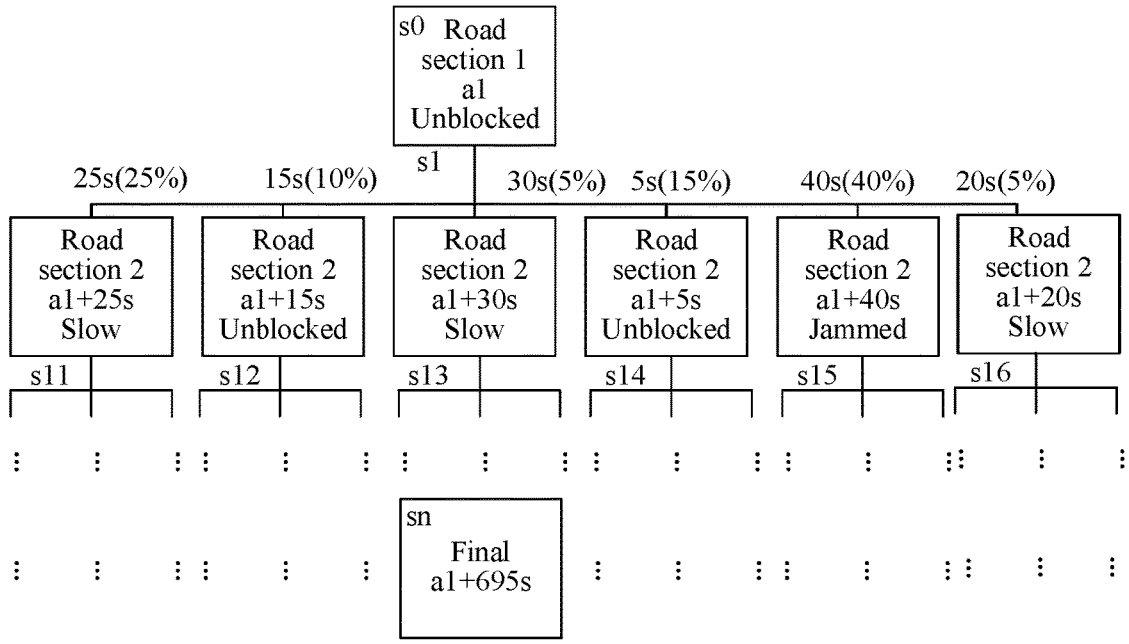
FIG. 4 is a schematic diagram of historical travel data according to an embodiment of this application.

For example, historical travel data of a road section 1 and a road section 2 in the plurality of sample road sections is shown in FIG. 4. The road section 1 is traveled through according to a travel time a1 at the state s0, and then six travel times for traveling through the road section 2 are shown. Probabilities of the travel times are different, and a sum is 100%. The schematic diagram of state transition shown in FIG. 5 may be obtained based on the historical travel data shown in FIG. 4.

Figure 5:
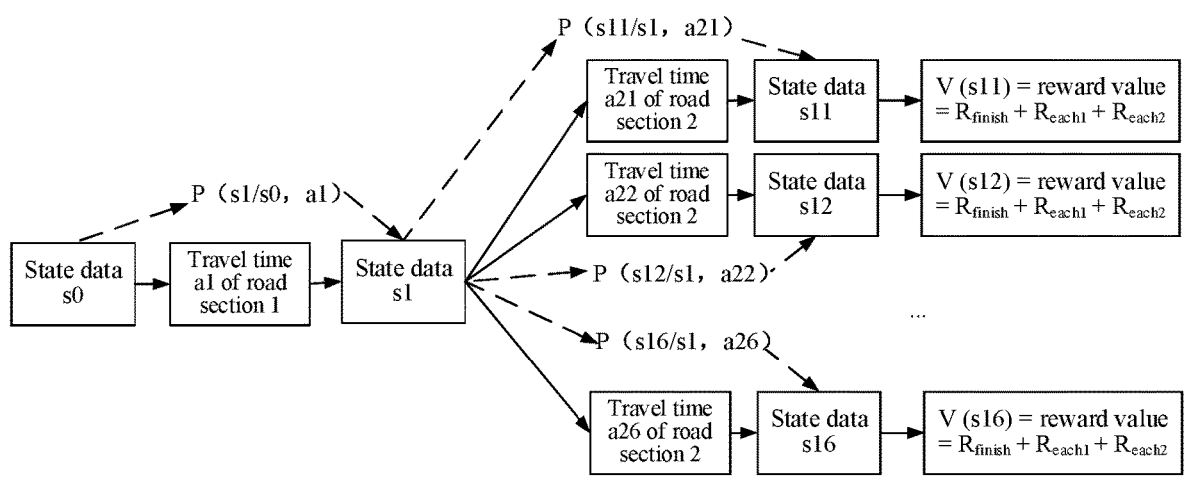
FIG. 5 is a schematic diagram of a state conversion according to an embodiment of this application.

Referring to FIG. 5, because six travel times of the road section 2 are shown, six sample routes are formed. Each sample route includes the road section 1 and the road section 2. In each sample route, it may be calculated that a reward value is a sum of a global reward value $R_{finish}$ and local reward values $R_{each}$ of the two road sections, and a payoff value of the final state data is equal to the reward value. Therefore, payoff values of state data s11 to s16 may be obtained through calculation. Then, a payoff value of the state data s1 may be obtained through calculation by using the following formula:

$$V(s1) = P(s11|s1,a21)[R(s11|s1,a21) + \gamma V(s11) + \ldots + P(s16|s1,a26)[R(s11|s1,a26) + \gamma V(s11)]$$

P(s11|s1,a21) is a probability of transition from the state data s1 to the state data s11 by traveling through the road section 1 according to a travel time a21, that is, a probability of the travel time a21. R(s11|s1,a21) is a payoff value of the state data s11 in a case of transition from the state data s1 to the state data s11 by traveling through the road section 1 according to the travel time a21, that is, the payoff value of s11. Calculation for other road sections is similar to the process described herein. Details are not described herein again. Then, a payoff value of the state data s0 may also be obtained through calculation in a similar manner, and further the payoff value of each state data is obtained.

In step 106, the method performs training according to each state data and the payoff value of each state data, to obtain a payoff value prediction model. In the foregoing step 106, a correspondence between the state data and the payoff values may be determined, and the correspondence is used as a sample data group. In this case, training is performed according to each sample data group, to obtain the payoff value prediction model. The payoff value prediction model is used for obtaining a payoff value of any state data according to the state data. The payoff value is used for representing an expected future payoff in the current state.

In an implementation, the payoff value prediction model may be trained by using a deep neural network algorithm. Initially, preset random values are used in the payoff value prediction model. After continuous attempts and learning, the payoff value prediction model can learn a rule of the payoff values corresponding to the state data, and model parameters of the payoff value prediction model are updated. The model keeps updating with trial-and-error learning, so that the accuracy of the model is continuously improved, and the randomly initialized model is continuously optimized until convergence. In this case, a decision made based on the payoff value prediction model tends to be optimal.

According to the method provided in this embodiment of this application, the historical travel data of each road section is obtained from the at least one sample route, so that the sample route can be described from the local perspective. Training is performed according to the obtained historical travel data, to obtain the travel time selection model and the state data prediction model for the road section. The travel time and the state data can be predicted based on the travel time selection model and the state data prediction model by using the road section as a unit. The local information of the route is fully considered, thereby improving the prediction accuracy.

In addition, the payoff value prediction model may be trained according to the obtained historical travel data and the trained travel time selection model and state data prediction model, and the payoff value of each state data may be predicted based on the payoff value prediction model by using the road section as a unit. The accuracy of the state data is measured by using the payoff value, so that a more reasonable travel time is determined according to the state data, thereby improving the accuracy.

In addition, the prediction model used in the related art is basically incapable of predicting a traffic condition of the route, and prediction is performed only according to a traffic condition at a start-off time point, resulting in a big difference between the travel time to arrive at an end point and an actual travel time. However, in this embodiment of this application, the real-time travel speed of the road section may be predicted by training at least one of the first speed prediction model and the second speed prediction model. The real-time travel speed can represent the traffic condition of the road section when the road section is reached, and therefore, the impact of the real-time travel condition can be considered during prediction of the travel time, so that the prediction is more accurate.

Figure 6:
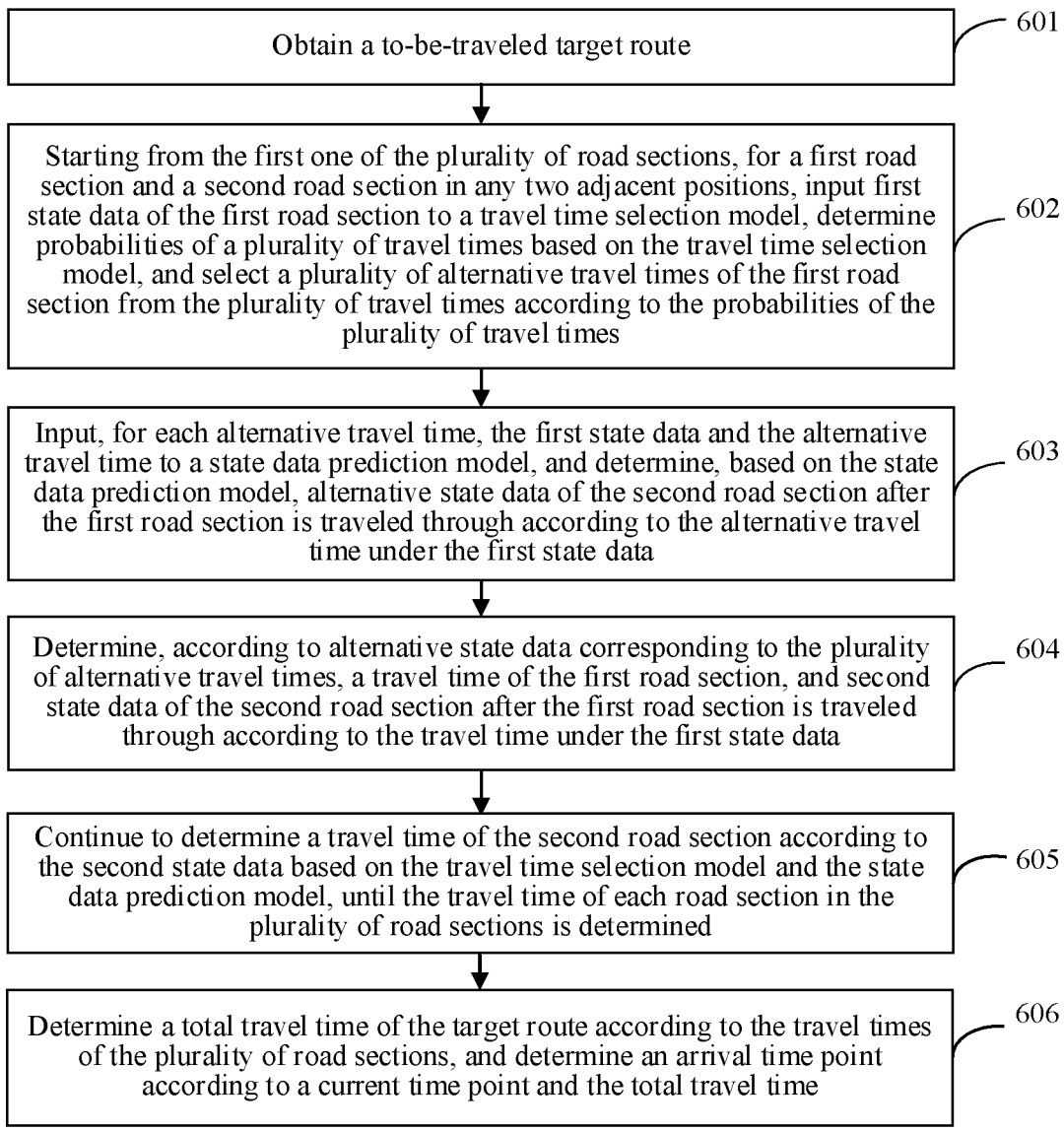
FIG. 6 is a flowchart of a travel time determining method according to an embodiment of this application.

FIG. 6 is a flowchart of a travel time determining method according to an embodiment of this application. The travel time determining method is performed by a training apparatus. A process of predicting a travel time of a target route is described. The prediction apparatus may be terminal having a navigation function, such as a mobile phone or a computer, a server, and the like. The prediction apparatus and the training apparatus in the foregoing embodiment may be the same apparatus, or may be different apparatuses. When the prediction apparatus and the training apparatus are different apparatuses, the training apparatus may provide a trained model to the prediction apparatus for use by the prediction apparatus. Referring to FIG. 6, the method includes the following steps:

In step 601, the method can obtain a to-be-traveled target route. The target route includes a plurality of road sections arranged sequentially, any two road sections in adjacent positions are connected, and an end point of a road section is a start point of a next road section.

The target route may be selected by a user, or may be selected in an electronic map by the prediction apparatus according to a start point and an end point. For example, when the user intends to start out for a certain destination, the prediction apparatus may use a current position of the user as a route start point, the destination as a route end point, and one or more routes from the start point to the end point in the electronic map as a target route/target routes, to predict a total travel time of each target route.

In step 602, starting from the first one of the plurality of road sections, for a first road section and a second road section adjacent to each other in any two positions, the method can input first state data of the first road section to a travel time selection model, determine probabilities of a plurality of travel times based on the travel time selection model, and select a plurality of alternative travel times of the first road section from the plurality of travel times according to the probabilities of the plurality of travel times.

In this embodiment of this application, the travel time selection model is used for determining probabilities of a plurality of travel times according to state data of a road section. In this case, the first state data of the first road section is inputted to the travel time selection model, and the probabilities of the plurality of travel times are determined based on the travel time selection model. Then, the plurality of alternative travel times may be selected from the plurality of travel times according to the probabilities of the plurality of travel times. If a preset quantity of travel times selected according to a descending order of the probabilities are used as the alternative travel times, the plurality of alternative travel times are obtained. The preset quantity may be determined according to accuracy requirements, or may be determined according to the quantity of the plurality of travel times and a fixed selection ratio. For example, state data $s_{i,t}$ of a road section i is inputted to the travel time selection model, to obtain an alternative travel time $a_i$ of the road section i.

In step 603, the method can input, for each alternative travel time, the first state data and the alternative travel time to a state data prediction model, and determine, based on the state data prediction model, alternative state data of the second road section after the first road section is traveled through according to the alternative travel time under the first state data. For example, the state data $s_{i,t}$ and the alternative travel time $a_i$ of the road section i are inputted to the state data prediction model, to obtain alternative state data $s_{i+1,t+1}$ of the road section i+1 at the time point t+1 of reaching the road section i+1 by travelling through the road section i after the time point t according to the alternative travel time $a_i$.

In an implementation, state data of any road section includes real-time data of the road section. The real-time data refers to a real-time travel speed of the road section, that is, a real-time travel speed of the road section at a start point of the road section. In this case, a real-time travel speed of the first road section at the time point of reaching the start point of the first road section and an alternative travel time of the first road section are inputted to the first speed prediction model. A real-time travel speed of the second road section at a time point of reaching the end point of the first road section is determined based on the first speed prediction model after the first road section is traveled through according to the alternative travel time.

For example, i represents a road section, and i+1 represents a next road section, where i is an integer. A real-time travel speed $V_{i+1, t+1}$ of the road section i+1 at a time point t+1 of reaching a start point of the road section i+1 after the road section i is traveled through according to the travel time $a_i$ may be predicted based on the first speed prediction model according to a real-time travel speed $V_{i,t}$ of the road section i at a time point t of reaching a start point of the road section i and the travel time $a_i$ of the road section i.

Optionally, to improve the accuracy, the real-time travel speed of the first road section and the real-time travel speed of the second road section at the time point of reaching the start point of the first road section, and the alternative travel time of the first road section may be further inputted to the first speed prediction model, and the real-time travel speed of the second road section at the time point of reaching the end point of the first road section is determined based on the first speed prediction model after the first road section is traveled through according to the alternative travel time.

For example, the real-time travel speed $V_{i+1,t+1}$ of the road section i+1 at the time point t+1 of reaching the start point of the road section i+1 after the road section i is traveled through according to the travel time $a_i$ may be predicted based on the first speed prediction model according to the real-time travel speed $V_{i,t}$ of the road section i and a real-time travel speed $V_{i+1,t}$ of the road section i+1 at the time point t of reaching the start point of the road section i as well as the travel time $a_i$ of the road section i.

In another implementation, the state data of any road section includes real-time data of a remaining road section, where the real-time data of the remaining road section refers to a real-time travel speed of each road section after the current road section, that is, a real-time travel speed of each road section after the road section when the start point of the current road section is reached. In this case, the real-time travel speed of each road section after the first road section at the time point of reaching the start point of the first road section and the alternative travel time of the first road section are inputted to the second speed prediction model, and a real-time travel speed of each road section after the second road section at the time point of reaching the end point of the first road section is determined based on the second speed prediction model after the first road section is traveled through according to the alternative travel time.

For example, i represents a road section, and i+1 represents a next road section, where i is an integer. A real-time travel speed $V_{left, i+1, t+1}$ of each road section after the road section i+1 at a time point t+1 of reaching a start point of the road section i+1 after the road section i is traveled through according to a travel time $a_i$ may be predicted based on the second speed prediction model according to a real-time travel speed $V_{left,i,t}$ of each road section after the road section i at a time point t of reaching a start point of the road section i as well as the travel time $a_i$ of the road section i.

Optionally, to improve the accuracy, the real-time travel speed of each road section after the first road section and the real-time travel speed of each road section after the second road section at the time point of reaching the start point of the first road section, and the alternative travel time of the first road section may be further inputted to the second speed prediction model. A real-time travel speed of each road section after the second road section at the time point of reaching the end point of the first road section after the first road section is traveled through according to the alternative time is determined based on the second speed prediction model.

For example, a real-time travel speed $V_{left, i+1, t+1}$ of each road section after the road section i+1 at the time point t+1 of reaching the start point of the road section i+1 after the road section i is traveled through according to the travel time $a_i$ may be predicted based on the second speed prediction model according to the real-time travel speeds $V_{left,i,t}$ of each road section after the road section i and the real-time travel speed $V_{left,i+1,t}$ of each road section after the road section i+1 at the time point t of reaching the start point of the road section i, as well as the travel time $a_i$ of the road section i.

In addition, in a case of transition from the first state data to the second state data, for items of the state data except the foregoing real-time data of the road section and the real-time data of the remaining road section, an initial speed in the second state data is equal to an initial speed of the first state data, and therefore, the initial speed is unchanged. Because both the road section and the time point have changed, the historical statistical speed becomes historical statistical speed of the second road section at the time point of reaching the end point of the first road section, the travel time of the first road section needs to be added to an original cumulative travel time, to update the cumulative travel time.

For example, the state data of the road section i at the time point t is $s_{i,t}=<V_0, V_{hts,i,t}, T_{sum,i,t}, L_{i,t}, L_{left,i,t}>$. When the road section i is traveled through according to the travel time to reach the road section i+1, the state data of the road section i+1 at the time point t+1 is $S_{i+1,t+1}=<V_0, V_{hts,i+1,t+1}, T_{sum, i+1, t+1}, L_{i+1,t+1}, L_{left, i+1, t+1}>$.

In step 604, the method can determine, according to alternative state data corresponding to the plurality of alternative travel times, a travel time of the first road section, and second state data of the second road section after the first road section is traveled through according to the travel time under the first state data.

In an implementation, the alternative state data corresponding to each alternative travel time is inputted to a payoff value prediction model, and a payoff value of each alternative state data is obtained based on the payoff value prediction model, the payoff value being used for measuring prediction accuracy of the corresponding state data. In this case, alternative state data having a maximum payoff value is selected from the alternative state data corresponding to the plurality of alternative travel times, and is determined as the second state data. The alternative travel time corresponding to the second state data is determined as the travel time of the first road section.

After obtaining the target route, the prediction apparatus determines, for a first road section and a second road section adjacent to each other in any two positions, a travel time of the first road section according to first state data of the first road section based on the travel time selection model and the state data prediction model, and second state data of the second road section after the first road section is traveled through according to the travel time under the first state data. The foregoing steps 602 to 604 are optional steps. The prediction apparatus may alternatively determine the travel time of the first road section and the second state data in other manners.

In another embodiment, the travel time selection model is used for determining a travel time of any road section according to the state data of the any road section. Therefore, the first state data is inputted to the travel time selection model, the travel time of the first road section is determined based on the travel time selection model, the first state data and the travel time are inputted to the state data prediction model, and the second state data is determined based on the state data prediction model.

In step 605, the method can continue to determine a travel time of the second road section according to the second state data based on the travel time selection model and the state data prediction model, until the travel time of each road section in the plurality of road sections is determined. After the second state data is obtained, the foregoing steps 602 to 604 may continue to be performed on the second road section and the next road section of the second road section, to determine the travel time of the second road section, and the travel time of each road section in the target route may be determined in a similar way.

In step 606, the method can determine a total travel time of the target route according to the travel times of the plurality of road sections, and determine an arrival time point according to a current time point and the total travel time. A sum of the travel times of the plurality of road sections in the target route is determined as the total travel time of the target route, and the current time point is used as a start time point of the user. In this case, a time point obtained by adding the total travel time to the start time point is the arrival time point.

According to the method provided in this embodiment of this application, the travel time selection model and the state data prediction model for the road section are obtained through training. The travel time and the state data can be predicted based on the travel time selection model and the state data prediction model by using the road section as a unit. The local information of the route is fully considered, thereby improving the prediction accuracy, and making up for disadvantages of a conventional prediction model.

In addition, the payoff value prediction model for the road section is obtained through training, and the payoff value of each state data may be predicted based on the payoff value prediction model by using the road section as a unit, where the payoff value is used for measuring the accuracy of the state data, so that a more reasonable travel time is determined according to the state data, thereby improving the accuracy.

In addition, the prediction model used in the related art is basically incapable of predicting a traffic condition of the route, and prediction is performed only according to a traffic condition at a start-off time point, resulting in a big difference between the travel time to arrive at an end point and an actual travel time. However, in this embodiment of this application, the real-time travel speed of the road section may be predicted by training at least one of the first speed prediction model and the second speed prediction model. The real-time travel speed can represent the traffic condition of the road section when the road section is reached, and therefore, the impact of the real-time travel condition can be considered during prediction of the travel time, so that the prediction is more accurate.

In conclusion, in this embodiment of this application, the travel time selection model and the state data prediction model jointly form a policy network in the prediction solution. The travel time selection model is used for determining an appropriate estimate of the travel time for the current road section in the current state, and the state data prediction model predicts the next state data based on an output of the travel time selection model. For example, the state data prediction model predicts the most likely next state and specific state data.

A value network is formed by the payoff value prediction model in this embodiment of this application, to estimate the payoff of the state data of each travel time, thus obtaining a correlation between the value network and an optimal policy. Through training according to a large amount of historical travel data, the model learns a correlation between variations in a road passing capacity and variations based on the time, the road section and the real-time travel speed. During prediction of the travel time of each road section based on the model, the learned variations are taken into consideration, and a prediction result is determined by integrating results given by the policy network and the value network.

The embodiment of this application provides a prediction solution based on the reinforcement learning framework by using the travel time selection model, the state data prediction model, and the payoff value prediction model. An optimal decision process is obtained through sample data training, and finally the prediction result may be outputted.

The prediction solution does not need detailed rule design. The local information of the route can be reserved through road section level modeling, and a reasoning ability is achieved. Theoretically, travel condition variations can be predicted. In addition, with an online updating feature of the reinforcement learning framework, the prediction solution is highly sensitive to sample data, and may update data such as a user travel condition, a user distribution change, and a traffic condition in real time.

Figure 7:
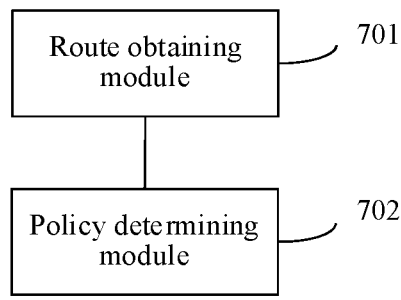
FIG. 7 is a schematic structural diagram of a travel time determining apparatus according to an embodiment of this application.

FIG. 7 is a schematic structural diagram of a travel time determining apparatus according to an embodiment of this application. Referring to FIG. 7, the apparatus can include a route obtaining module 701 that is configured to perform the step of obtaining a target route in the foregoing embodiment, and a policy determining module 702 that is configured to perform the step of determining a travel time of a first road section, and second state data in the foregoing embodiment. The policy determining module 702 can further be configured to perform the step of continuing to determine a travel time of a second road section according to the second state data, until a travel time of each road section in the plurality of road sections is determined in the foregoing embodiment. Of course, one or more of the modules of this disclosure can be implemented by processing circuitry.

Optionally, the policy determining module 702 may further include a time determining unit that is configured to perform the step of determining the travel time of the first road section based on a travel time selection model in the foregoing embodiment, and a state determining unit that is configured to perform the step of determining the second state data based on a state data prediction model in the foregoing embodiment.

Optionally, the policy determining module 702 can include alternative time determining unit that is configured to perform the step of determining probabilities of a plurality of travel times based on the travel time selection model, and selecting a plurality of alternative travel times of the first road section in the foregoing embodiment. Also, the determining module 702 can include an alternative state determining unit that is configured to perform the step of determining, for each alternative travel time based on the state data prediction model, alternative state data of the second road section after the first road section is traveled through according to the alternative travel time under the first state data in the foregoing embodiment, and a policy determining unit that is configured to perform the step of determining, according to alternative state data corresponding to the plurality of alternative travel times, the travel time of the first road section, and the second state data corresponding to the travel time in the foregoing embodiment.

In an embodiment, the policy determining unit can be further configured to perform the step of obtaining a payoff value of the alternative state data based on the payoff value prediction model, selecting alternative state data having a maximum payoff value, determining the selected alternative state data as the second state data, and determining the travel time of the first road section in the foregoing embodiment.

Optionally, the policy determining unit is further configured to perform the step of obtaining a real-time travel speed of the first road section at a first time point, and determining a real-time travel speed of the second road section at a second time point based on a first speed prediction model in the foregoing embodiment. The policy determining unit can be further configured to perform the step of obtaining a real-time travel speed of each road section after the first road section at the first time point, and determining a real-time travel speed of each road section after the second road section at the second time point based on a second speed prediction model in the foregoing embodiment.

Optionally, the apparatus further includes a sample obtaining module that is configured to perform the step of obtaining historical travel data of each road section in at least one sample route in the foregoing embodiment, and a first training module that is configured to perform the step of constructing a plurality of first sample data groups according to the obtained historical travel data, and performing training to obtain the travel time selection model in the foregoing embodiment. Further, the apparatus can include a second training module that is configured to perform the step of constructing a plurality of second sample data groups according to the obtained historical travel data, and performing training to obtain the state data prediction model in the foregoing embodiment.

Additionally, the apparatus can include a reward obtaining module that is configured to perform the step of obtaining, for each sample route, a global reward value of the sample route and a local reward value of each road section in the sample route in the foregoing embodiment, and a payoff obtaining module that is configured to perform the step of obtaining, for first sample state data of any road section in the at least one sample route, a payoff value of the first sample state data, until a payoff value of each state data in the at least sample route is obtained in the foregoing embodiment. The apparatus can further include a third training module that is configured to perform the step of performing training according to each state data and the payoff value of each state data, to obtain a payoff value prediction model in the foregoing embodiment.

Optionally, the reward obtaining module includes a time predicting unit that is configured to perform the step of determining a predicted travel time of each road section in the sample route based on the currently trained travel time selection model and state data prediction model in the foregoing embodiment, and a global reward obtaining module that is configured to perform the step of obtaining a predicted total travel time of the sample route according to the predicted travel time of each road section, and determining the global reward value of the sample route according to a first error between the predicted total travel time of the sample route and an actual total travel time of the sample route in the foregoing embodiment. The obtaining module can further include a local reward obtaining module that is configured to perform the step of determining the local reward value of each road section according to a second error between the predicted travel time of each road section and an actual travel time of each road section in the foregoing embodiment.

Optionally, the payoff obtaining module is configured to obtain the payoff value of the first sample state data by using the following formula:

$$V^\pi(s_i) = \Sigma_{s_{i+1} \in s} P(s_{i+1}|s_i, a_i)[R(s_{i+1}|s_i, a_i) + \gamma V^\pi(s_{i+1})]$$

in the foregoing embodiment.

When the travel time determining apparatus provided in the foregoing embodiments determines the travel time, the division of the foregoing functional modules is merely used as an example for description. In actual application, the foregoing functions may be allocated to and completed by different functional modules according to requirements, that is, an internal structure of the training apparatus or the prediction apparatus is divided into different functional modules, to complete all or some of the functions described above. In addition, the travel time determining apparatus provided in the foregoing embodiment belongs to the same concept as the embodiment of the travel time determining method. For a specific implementation process of the apparatus, refer to the method embodiment. Details are not described herein again.

Figure 8:
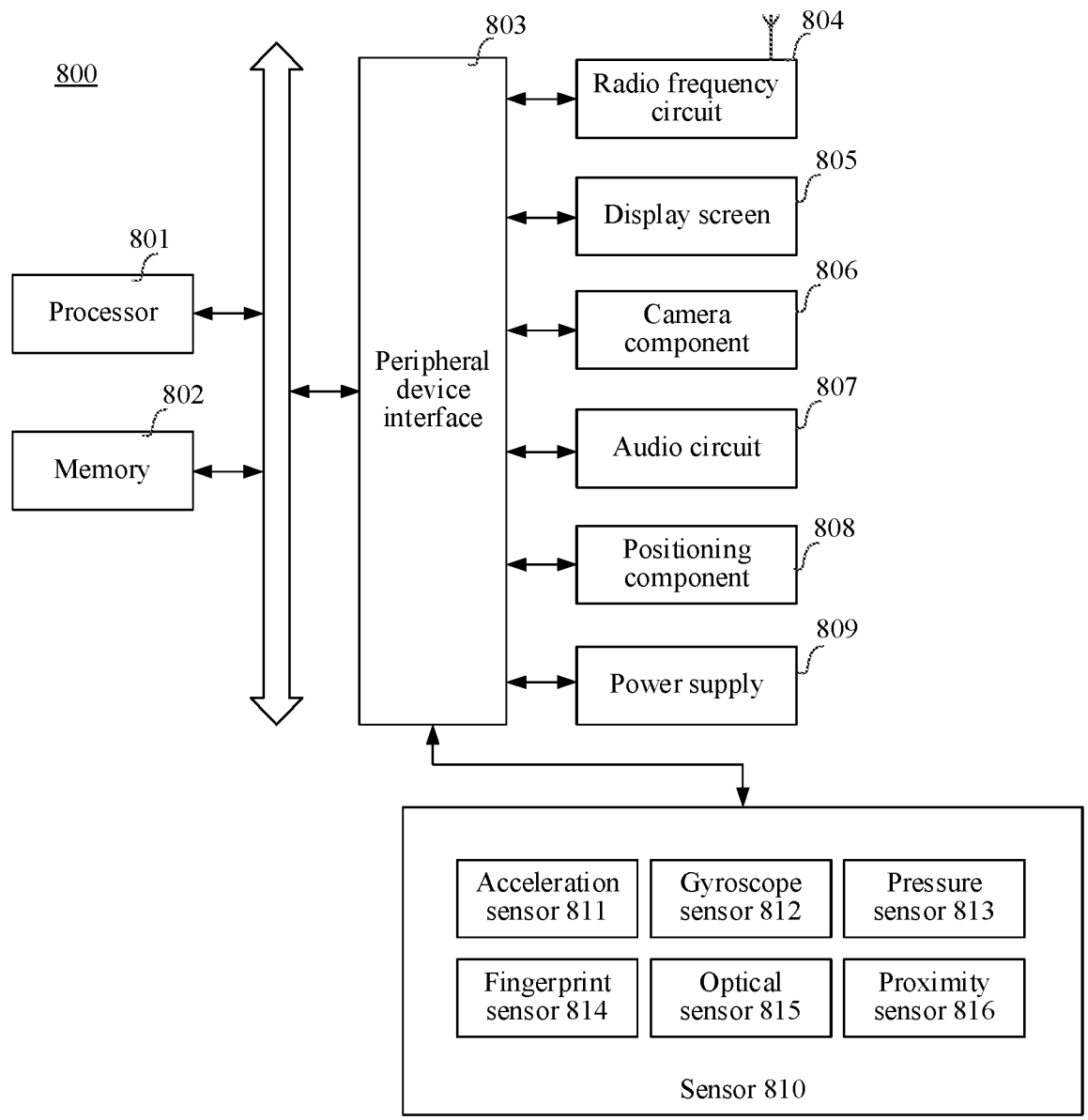
FIG. 8 is a schematic structural diagram of a terminal according to an embodiment of this application.

FIG. 8 is a structural block diagram of a terminal 800 according to an exemplary embodiment of this application. The terminal 800 may be a portable mobile terminal, for example, a smartphone, a tablet computer, a moving picture experts group audio layer III (MP3) player, a moving picture experts group audio layer IV (MP4) player, a notebook computer, a desktop computer, a head mounted device, or any other intelligent terminal. The terminal 800 may also be referred to as a user device, a portable terminal, a laptop computer, a desktop terminal or the like.

Generally, the terminal 800 includes a processor 801 and a memory 802.

The processor 801 may include one or more processing cores, for example, a 4-core processor or an 8-core processor. Processing circuitry such as the processor 801 may be implemented by at least one hardware form of a digital signal processor (DSP), a field programmable gate array (FPGA), and a programmable logic array (PLA). The processor 801 may also include a main processor and a coprocessor. The main processor is a processor configured to process data in an awake state, and is also referred to as a central processing unit (CPU). The coprocessor is a low-power processor configured to process the data in a standby state. In some embodiments, the processor 801 may be integrated with a graphics processing unit (GPU). The GPU is configured to be responsible for rendering and drawing content that a display screen needs to display. In some embodiments, the processor 801 may further include an artificial intelligence (AI) processor. The AI processor is configured to process a computing operation related to machine learning.

The memory 802 may include one or more computer-readable storage media. The computer-readable storage medium may be non-transient. The memory 802 may further include a high-speed random access memory, and a non-volatile memory such as one or more magnetic disk storage devices and a flash memory device. In some embodiments, the non-transitory computer-readable storage medium in the memory 802 is configured to store at least one instruction, and the at least one instruction is configured to be executed by processor 801 to implement the travel time determining method provided in the method embodiment of this application.

In some embodiments, the terminal 800 may further optionally include a peripheral device interface 803 and at least one peripheral device. The processor 801, the memory 802, and the peripheral device interface 803 may be connected through a bus or a signal cable. Each peripheral device may be connected to the peripheral device interface 803 through a bus, a signal cable, or a circuit board. Specifically, the peripheral device include: at least one of a radio frequency circuit 804, a touch display screen 805, a camera component 806, a frequency circuit 807, a positioning component 808, and a power supply 809.

The peripheral device interface 803 may be configured to connect at least one peripheral device related to input/output (I/O) to the processor 801 and the memory 802. In some embodiments, the processor 801, the memory 802, and the peripheral device interface 803 are integrated on the same chip or circuit board. In other some embodiments, any one or two of the processor 801, the memory 802, and the peripheral device interface 803 may be implemented on a single chip or circuit board. This is not limited in this embodiment.

The radio frequency circuit 804 is configured to receive and transmit a radio frequency (RF) signal, also referred to as an electromagnetic signal. The RF circuit 804 communicates with a communications network and other communications devices by using the electromagnetic signal. The radio frequency circuit 804 may convert an electric signal into the electromagnetic signal for transmission, or convert a received electromagnetic signal into the electric signal. Optionally, the radio frequency circuit 804 includes an antenna system, an RF transceiver, one or more amplifiers, a tuner, an oscillator, a digital signal processor, a codec chip set, a subscriber identity module card, and the like. The RF circuit 804 may communicate with other terminals through at least one wireless communication protocol. The wireless communication protocol includes, but is not limited to, a metropolitan area network, generations of mobile communications networks (2G, 3G, 4G, and 5G), a wireless local area network, and/or a WiFi network. In some embodiments, the radio frequency circuit 804 may further include a near field communication (NFC) related circuit. This is not limited in this application.

The display screen 805 is configured to display a user interface (UI). The UI may include a graph, a text, an icon, a video, and any combination thereof. When the display screen 805 is a touch screen, the display screen 805 is further capable of collecting a touch signal on or over a surface of the display screen 805. The touch signal may be inputted into the processor 801 as a control signal for processing. In this case, the display screen 805 may be further configured to provide a virtual button and/or a virtual keyboard, also referred to as a soft button and/or a soft keyboard. In some embodiments, there is one display screen 805, disposed on a front panel of the terminal 800. In some other embodiments, there may be two display screens 805, respectively disposed on different surfaces of the terminal 800 or designed in a foldable shape. In still some other embodiments, the display screen 805 may be a flexible display screen, disposed on a curved surface or a folded surface of the terminal 800. Even, the display screen 805 may be further set to have a non-rectangular irregular graph, that is, a special-shaped screen. The display screen 805 may be manufactured by using a material such as a liquid crystal display (LCD), an organic light-emitting diode (OLED), or the like.

The camera component 806 is configured to collect an image or a video. Optionally, the camera component 806 includes a front-facing camera and a rear-facing camera. Generally, the front-facing camera is disposed on the front panel of the terminal, and the rear-facing camera is disposed on a back face of the terminal. In some embodiments, there are at least two rear-facing cameras, each being any one of a main camera, a depth of field camera, a wide-angle camera, and a telephoto camera, to implement a Bokeh function through fusion of the main camera and the depth of field camera, panoramic photo shooting and virtual reality (VR) shooting functions through fusion of the main camera and wide-angle camera, or other fusion shooting functions. In some embodiments, the camera component 806 may further include a flash. The flash may be a single color temperature flash, or may be a double color temperature flash. The double color temperature flash refers to a combination of a warm flash and a cold flash, and be used for light compensation at different color temperatures.

The audio circuit 807 may include a microphone and a speaker. The microphone is configured to: collect a sound wave of a user and an environment, and convert the sound wave into the electrical signal to input to the processor 801 for processing, or to input to the radio frequency circuit 804 for implementing voice communication. For the purpose of stereo sound collection or noise reduction, there may be a plurality of microphones, respectively disposed at different parts of the terminal 800. The microphone may be further an array microphone or an omni-directional collection type microphone. The speaker is configured to convert the electrical signal from the processor 801 or the RF circuit 804 into the sound wave. The speaker may be a conventional thin-film speaker, or may be a piezoelectric ceramic speaker. When the speaker is the piezoelectric ceramic speaker, the electric signals not only can be converted into a human-audible sound wave, but also can be converted into a human-inaudible sound wave for ranging and the like. In some embodiments, the audio circuit 807 may further include an earphone jack.

The positioning component 808 is configured to position a current geographic location of the terminal 800, to implement a navigation or a location based service (LBS). The positioning component 808 may be a positioning component based on the global positioning system (GPS) of the United States, China's BeiDou System, the GLONASS system of Russia or the GALILEO system of the European Union.

The power supply 809 is configured to supply power for components in the terminal 800. The power supply 809 may be an alternating current, a direct current, a disposable battery, or a rechargeable battery. When the power supply 809 includes the rechargeable battery, the rechargeable battery may support wired charging or wireless charging. The rechargeable battery may be further configured to support a quick charge technology.

In some embodiments, the terminal 800 further includes one or more sensors 810. The one or more sensors 810 include, but are not limited to: an acceleration sensor 811, a gyroscope sensor 812, a pressure sensor 813, a fingerprint sensor 814, an optical sensor 815, and a proximity sensor 816.

The acceleration sensor 811 may detect acceleration on three coordinate axes of a coordinate system established by the terminal 800. For example, the acceleration sensor 811 may be configured to detect a component of gravity acceleration on the three coordinate axes. The processor 801 may control, according to a gravity acceleration signal collected by the acceleration sensor 811, the display screen 805 to display the user interface in a transverse view or a longitudinal view. The acceleration sensor 811 may be further configured to collect motion data of a game or a user.

The gyro sensor 812 may detect a body direction and a rotation angle of the terminal 800. The gyro sensor 812 may cooperate with the acceleration sensor 811 to collect a 3D action performed by the user on the terminal 800. The processor 801 may implement the following functions according to the data collected by the gyro sensor 812: motion sensing (such as changing the UI according to a tilt operation of the user), image stabilization during shooting, game control, and inertial navigation.

The pressure sensor 813 may be disposed at a side frame of the terminal 800 and/or a lower layer of the display screen 805. When the pressure sensor 813 is disposed on the side frame of the terminal 800, a holding signal of the user on the terminal 800 may be detected. The processor 801 performs left and right hand recognition or a quick operation according to the holding signal collected by the pressure sensor 813. When the pressure sensor 813 is disposed on the lower layer of the display screen 805, the processor 801 controls an operable control on the UI interface according to a pressure operation of the user on the display screen 805. The operable control includes at least one of a button control, a scroll bar control, an icon control, and a menu control.

The fingerprint sensor 814 is configured to collect a fingerprint of the user. The processor 801 identifies an identity of the user according to the fingerprint collected by the fingerprint sensor 814, or the fingerprint sensor 814 identifies an identity of the user according to the collected fingerprint. When identifying that the user's identity is a trusted identity, the processor 801 authorizes the user to perform related sensitive operations. The sensitive operations include unlocking a screen, viewing encrypted information, downloading software, payment, changing settings, and the like. The fingerprint sensor 814 may be disposed on a front surface, a back surface, or a side surface of the terminal 800. When a physical button or a vendor logo is disposed on the terminal 800, the fingerprint 814 may be integrated with the physical button or the vendor logo.

The optical sensor 815 is configured to collect ambient light intensity. In an embodiment, the processor 801 may control display luminance of the display screen 805 according to the ambient light intensity collected by the optical sensor 815. Specifically, when the ambient light intensity is relatively high, the display brightness of the display screen 805 is turned up. When the ambient light intensity is relatively low, the display brightness of the display screen 805 is turned down. In another embodiment, the processor 801 may further dynamically adjust shooting parameters of the camera component 806 according to the ambient light intensity collected by the optical sensor 815.

The proximity sensor 816, also referred to as a distance sensor, is usually disposed on the front panel of the terminal 800. The proximity sensor 816 is configured to collect a distance between a front face of the user and the front face of the terminal 800. In an embodiment, when the proximity sensor 816 detects that a distance between the user and the front surface of the terminal 800 is gradually decreased, the display screen 805 is controlled by the processor 801 to switch from a screen-on state to a screen-off state. When the proximity sensor 816 detects that the distance between the user and the front surface of the terminal 800 is gradually increased, the display screen 805 is controlled by the processor 801 to switch from the screen-off state to the screen-on state.

A person skilled in the art may understand that the structure shown in FIG. 8 does not constitute a limitation to the terminal 800, and the terminal may include more components or fewer components than those shown in the figure, or some components may be combined, or a different component deployment may be used.

Figure 9:
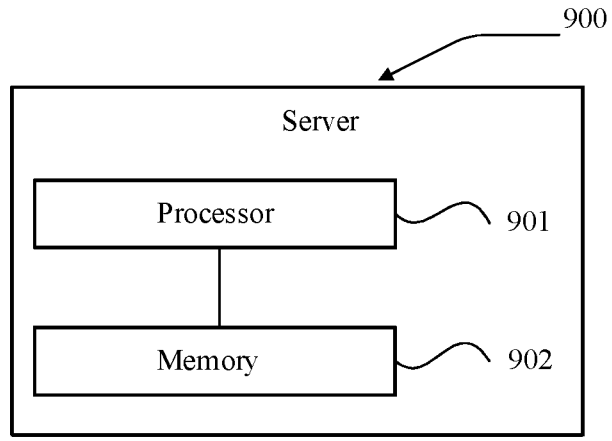
FIG. 9 is a schematic structural diagram of a server according to an embodiment of this application.

FIG. 9 is a schematic structural diagram of a server according to an embodiment of this application. The server 900 may vary greatly due to different configurations or performance, and may include one or more central processing units (CPU) 901 and one or more memories 902. The memory 902 stores at least one instruction, the at least one instruction being loaded and executed by the processor 901 to perform the method provided in the foregoing method embodiments. Certainly, the server may further include components such as a wired or wireless network interface, a keyboard, and an I/O interface, to facilitate I/O. The server may further include another component configured to implement functions of a device, and details are not described herein again.

The server 900 may be configured to perform the steps executed by the prediction apparatus in the foregoing travel time determining.

Figure 10:
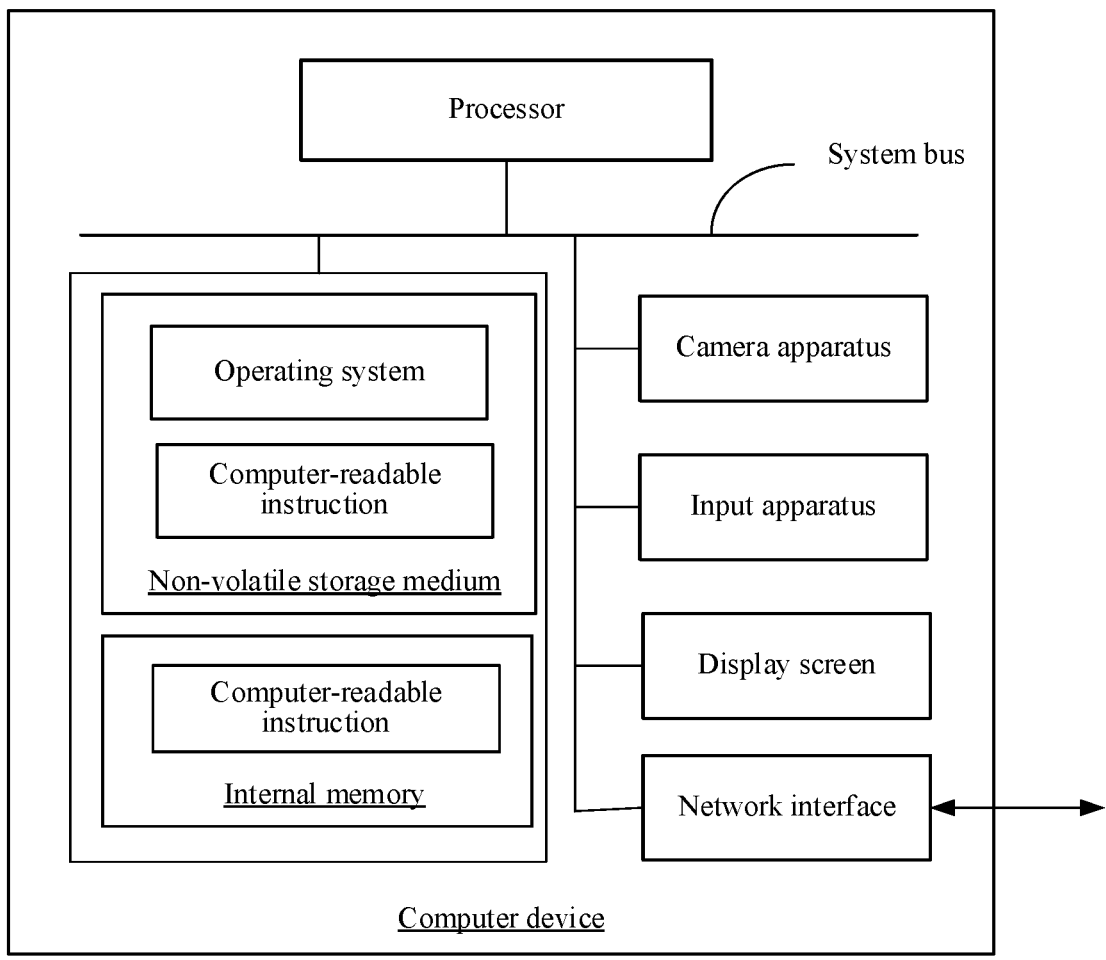
FIG. 10 is a schematic structural diagram of a computer device according to an embodiment of this application.

FIG. 10 is a diagram of an internal structure of a computer device in an embodiment. The computer device may be specifically the terminal 110 or the server 120 in FIG. 1A. As shown in FIG. 10, the computer device includes a processor, a memory, a network interface, an input apparatus and a display screen that are connected by using a system bus. The memory includes a non-volatile storage medium and an internal memory. The non-volatile storage medium of the computer device stores an operating system, and may further store computer-readable instructions. The computer-readable instructions, when executed by the processor, cause the processor to perform the travel time determining method. The internal memory may also store computer-readable instructions, the computer-readable instructions, when executed by the processor, causing the processor to perform the travel time determining method. The display screen of the computer device may be a liquid crystal display screen or an electronic ink display screen. The input apparatus of the computer device may be a touch layer covering the display screen, or may be a key, a trackball or a touchpad disposed on a housing of the computer device, or may further be an external keyboard, a touchpad, a mouse, or the like.

A person skilled in the art may understand that, the structure shown in FIG. 10 is merely a block diagram of a partial structure related to the solution in this application, and does not constitute a limitation to the computer device to which the solution of this application is applied. Specifically, the computer device may include more components or fewer components than those shown in the figure, or some components may be combined, or a different component deployment may be used.

In an embodiment, the travel time determining apparatus provided in this application may be implemented in a form of a computer-readable instruction, and the computer-readable instruction may run on the computer device shown in FIG. 10. Program modules included in the travel time determining apparatus, such as the route obtaining module and the policy determining module shown in FIG. 7, may be stored in the memory of the computer device. The computer-readable instructions formed by the program modules cause the processor to perform the steps in the travel time determining method in the embodiments of this application described in this specification.

For example, the computer device shown in FIG. 10 may obtain a to-be-traveled target route by using the route obtaining module in the travel time determining apparatus shown in FIG. 7, the target route including a plurality of road sections arranged sequentially. The computer device may be configured to: determine, for a first road section and a second road section adjacent to each other in any two positions starting from the first one of the plurality of road sections, a travel time of the first road section according to first state data of the first road section based on a travel time selection model and a state data prediction model, and second state data of the second road section after the first road section is traveled through according to the travel time under the first state data. The computer device may be further configured to continue to determine a travel time of the second road section by using the policy determining module according to the second state data based on the travel time selection model and the state data prediction model, until a travel time of each road section in the plurality of road sections is determined.

In an embodiment, a computer device is provided, including a memory and a processor, the memory storing computer-readable instructions, the computer-readable instructions, when executed by a processor, causing the processor to perform the steps of the foregoing travel time determining method. The steps of the travel time determining method herein may be the steps of the travel time determining method in the foregoing embodiments.

In an embodiment, a computer-readable storage medium is provided, and stores computer-readable instructions, the computer-readable instructions, when executed by a processor, cause the processor to perform the steps of the foregoing travel time determining method. The steps of the travel time determining method herein may be the steps of the travel time determining method in the foregoing embodiments.

A person of ordinary skill in the art may understand that some or all procedures in the methods in the foregoing embodiments may be implemented by a computer-readable instruction instructing related hardware, the program may be stored in a non-volatile computer-readable storage medium, and when the program is executed, the procedures in the foregoing method embodiments may be implemented. Any reference to the memory, storage, a database, or other media used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a rambus direct RAM (RDRAM), a direct rambus dynamic RAM (DRDRAM), and a rambus dynamic RAM (RDRAM).

The technical features in the foregoing embodiments may be combined in other manners. For concise description, not all possible combinations of the technical features in the embodiments are described. However, as long as combinations of the technical features do not conflict with each other, the combinations of the technical features are considered as falling within the scope described in this specification.

The foregoing embodiments only show several implementations of this application and are described in detail, but shall not be understood as a limitation to the patent scope of this application. A person of ordinary skill in the art may further make variations and improvements without departing from the concept of this application, and the variations and improvements shall fall within the protection scope of this application. Therefore, the protection scope of this application shall be subject to the protection scope of the appended claims.

What is claimed is:

1. A travel time determining method, the method comprising:
    obtaining, by processing circuitry, a to-be-traveled target route that includes a plurality of road sections that are arranged sequentially;
    predicting, by the processing circuitry, a travel time of a first road section of the to-be-traveled target route according to first state data of the first road section based on a travel time selection model and a state data prediction model trained on historical data of the first road section;

determining a predicted time of reaching a next road section that follows the first road section in the to-be-traveled target route based on the predicted travel time of all road sections preceding the next road section in the to-be-traveled target route;

predicting, by the processing circuitry, a travel time of the next road section by inputting the predicted time of reaching the next road section to a travel time selection model and a state data prediction model trained on historical data of the next road section; and continuing, by the processing circuitry, to determine the predicted time of reaching the next road section and predicting the travel time of the next road section until a travel time of each road section in the plurality of road sections is determined.

2. The method according to claim 1, wherein the predicting the travel time of the first road section further comprises:

inputting, by the processing circuitry, the first state data to the travel time selection model trained on the historical data of the first road section and determining the travel time of the first road section based on the travel time selection model trained on the historical data of the first road section.

3. The method according to claim 1, wherein the predicting the travel time of the first road section further comprises:

inputting the first state data to the travel time selection model trained on the historical data of the first road section, determining probabilities of a plurality of travel times based on the travel time selection model trained on the historical data of the first road section, and selecting a plurality of alternative travel times of the first road section from the plurality of travel times according to the probabilities of the plurality of travel times; and the predicting the travel time of the next road section further comprises:

inputting, for each alternative travel time of the first road section, the first state data and the alternative travel time to the state data prediction model trained on the historical data of a second road section after the first road section, and determining, based on the state data prediction model trained on historical data of the second road section, alternative state data of the second road section after the first road section is traveled through according to the alternative travel time under the first state data.

4. The method according to claim 3, wherein the determining the travel time of the first road section further comprises:

inputting the alternative state data corresponding to each alternative travel time to a payoff value prediction model, obtaining a payoff value of each alternative state data based on the payoff value prediction model, the payoff value being used for measuring prediction accuracy of the corresponding state data;

selecting, from the alternative state data corresponding to the plurality of alternative travel times, alternative state data having a maximum payoff value and determining the selected alternative state data as second state data of the second road section; and determining, the alternative travel time corresponding to the second state data as the travel time of the first road section.

5. The method according to claim 1, wherein:

state data of each road section of the to-be-traveled route includes a real-time travel speed of the respective road section, the state data prediction model trained on the historical data of the first road section includes a first speed prediction model, and the method further comprises:

determining predicting the travel time of the first road section according to the first state data based on the travel time selection model and the state data prediction model trained on historical data of the first road section;

determining, according to a current time point and a travel time of each road section before the first road section, a first time point of reaching a start point of the first road section, and obtaining a real-time travel speed of the first road section at the first time point; and inputting the real-time travel speed of the first road section at the first time point and the predicted travel time of the first road section to the first speed prediction model, and determining a real-time travel speed of a second road section following the first road section at a second time point based on the first speed prediction model, the second time point being determined according to the first time point and the predicted travel time.

6. The method according to claim 1, wherein:

state data of each road section of the to-be-traveled route includes a real-time travel speed of at least one next road section after the respective road section, the state data prediction model trained on the historical data of the first road section includes a second speed prediction model, and the method further comprises:

predicting the travel time of the first road section according to the first state data based on the travel time selection model and the state data prediction model trained on historical data of the first road section;

determining, according to a current time point and a travel time of each road section before the first road section, a first time point of reaching a start point of the first road section, and obtaining a real-time travel speed of each road section after the first road section at the first time point; and inputting the real-time travel speed of each road section after the first road section at the first time point and the predicted travel time of the first road section to a second speed prediction model trained on historical data of a second road section, and determining a real-time travel speed of each road section after a second road section following the first road section at a second time point based on the second speed prediction model, the second time point being determined according to the first time point and the predicted travel time.

7. The method according to claim 1, the method further comprising:

obtaining, by processing circuitry, historical travel data of each road section in at least one sample route, the historical travel data of each road section including travel time of the road section and state data of the road section;

constructing, by the processing circuitry, a plurality of first sample data groups according to the obtained historical travel data, each first sample data group including a state data group and travel time of a road section corresponding to the state data group;

performing, by the processing circuitry, training according to each first sample data group in order to obtain a travel time selection model trained on historical data of the road section corresponding to the respective sample data group; and constructing, by the processing circuitry, a plurality of second sample data groups according to the obtained historical travel data, each second sample data group including a state data group, the travel time of the road section corresponding to the state data group, and a next state data group of the state data group, and performing training according to each second sample data group in order to obtain a state data prediction model trained on historical data of the road section corresponding to the respective sample data group.

8. The method according to claim 7, the method further comprising:

obtaining, by the processing circuitry, for each sample route, a global reward value of the sample route and a local reward value of each road section in the sample route, the global reward value indicating accuracy of a predicted travel time of the sample route, and the local reward value indicating accuracy of a predicted travel time of a corresponding road section;

obtaining, by the processing circuitry, for first sample state data of a road section in the at least one sample route, a payoff value of the first sample state data according to a payoff value of next sample state data of the first sample state data in each sample route, a probability of transition from the first sample state data to the next sample state data, and a payoff value of the next sample state data when transitioning from the first sample state data to the next sample state data, until the payoff value of each state data in the at least one sample route is obtained, wherein payoff value of final state data in a sample route is equal to a sum of the global reward value of the sample route and the local reward value of each road section in the sample route; and performing, by the processing circuitry, training according to each state data and the payoff value of each state data, in order to obtain a payoff value prediction model that is used for obtaining a payoff value of state data.

9. The method according to claim 8, wherein the obtaining the global reward value of the sample route and the local reward value of each road section in the sample route further comprises:

determining a predicted travel time of each road section in the sample route based on a currently trained travel time selection model and state data prediction model;

obtaining a predicted total travel time of the sample route according to the predicted travel time of each road section, and determining the global reward value of the sample route according to a first error between the predicted total travel time of the sample route and an actual total travel time of the sample route, the global reward value being inversely proportional to the first error; and determining the local reward value of each road section according to a second error between the predicted travel time of each road section and an actual travel time of each road section, the local reward value being inversely proportional to the second error.

10. The method according to claim 8, wherein the obtaining the payoff value of the first sample state data comprises:

obtaining the payoff value of the first sample state data by using the following formula:

$$V^\pi(s_i) = \sum_{s_{i+1} \in s} P(s_{i+1} | s_i, a_i)[R(s_{i+1} | s_i, a_i) + \gamma V^\pi(s_{i+1})],$$

where $s_i$ representing the first sample state data, $V^\pi(s_i)$ representing the payoff value of the first sample state data, $s_{i+1}$ representing the next sample state data, $V^\pi(s_{i+1})$ representing the payoff value of the next sample state data, S representing a set including all next sample state data of the first sample state data in the at least one sample route, and $\pi$ representing a travel policy comprising travel times of a plurality of road sections; and $P(s_{i+1}|s_i, a_i)$ representing the probability of transition from the first sample state data to the next sample state data, and being equal to a probability of a travel time used during transition from the first sample state data to the next sample state data, $R(s_{i+1}|s_i, a_i)$ representing the payoff value of the next sample state data under condition of transition from the first sample state data to the next sample state data, and being equal to a local reward value of a road section that is traveled through during transition from the first sample state data to the next sample state data, and $\gamma$ representing a discount factor.

11. A travel time determining apparatus, the apparatus comprising:

processing circuitry that is configured to perform operations comprising:

obtaining a to-be-traveled target route including a plurality of road sections arranged sequentially;

predicting a travel time of a first road section of the to-be-traveled target route according to first state data of the first road section based on a travel time selection model and a state data prediction model trained on historical data of the first road section;

determining a predicted time of reaching a next road section that follows the first road section in the to-be-traveled target route based on the predicted travel time of all road sections preceding the next road section in the to-be-traveled target route;

predicting, by the processing circuitry, a travel time of the next road section by inputting the predicted time of reaching the next road section to a travel time selection model and a state data prediction model trained on historical data of the next road section;

continuing to determine the predicted time of reaching the next road section and predicting the travel time of the next road section until a travel time of each road section in the plurality of road sections is determined.

12. The apparatus according to claim 11, wherein the predicting the travel time of the first road section further comprises:

inputting the first state data to the travel time selection model trained on the historical data of the first road section and determining the travel time of the first road section based on the travel time selection model trained on the historical data of the first road section.

13. The apparatus according to claim 11, wherein the predicting the travel time of the first road section further comprises:

inputting the first state data to the travel time selection model trained on the historical data of the first road section, determining probabilities of a plurality of travel times based on the travel time selection model trained on the historical data of the first road section, and selecting a plurality of alternative travel times of the first road section from the plurality of travel times according to the probabilities of the plurality of travel times; and the predicting the travel time of the next road section further comprises:

inputting, for each alternative travel time of the first road section, the first state data and the alternative travel time to the state data prediction model trained on the historical data of a second road section after the first road section, and determining, based on the state data prediction model trained on historical data of the second road section, alternative state data of the second road section after the first road section is traveled through according to the alternative travel time under the first state data.

14. The apparatus according to claim 11, wherein:

state data of each road section of the to-be-traveled route includes a real-time travel speed of the respective road section, the state data prediction model trained on the historical data of the first road section includes a first speed prediction model, and the processing circuitry is further configured to perform:

predicting the travel time of the first road section according to the first state data based on the travel time selection model and the state data prediction model trained on the historical data of the first road section;

determining, according to a current time point and a travel time of each road section before the first road section, a first time point of reaching a start point of the first road section, and obtaining a real-time travel speed of the first road section at the first time point; and inputting the real-time travel speed of the first road section at the first time point and the predicted travel time of the first road section to the first speed prediction model, and determining a real-time travel speed of a second road section following the first road section at a second time point based on the first speed prediction model, the second time point being determined according to the first time point and the predicted travel time.

15. A non-transitory computer-readable storage medium storing computer-readable instructions that, when executed by one or more processors, cause the one or more processors to perform operations comprising:

obtaining a to-be-traveled target route that includes a plurality of road sections arranged sequentially;

predicting a travel time of a first road section of the to-be-traveled target route according to first state data of the first road section based on a travel time selection model and a state data prediction model trained on historical data of the first road section;

determining a predicted time of reaching a next road section that follows the first road section in the to-be-traveled target route based on the predicted travel time of all road sections preceding the next road section in the to-be-traveled target route;

predicting a travel time of the next road section by inputting the predicted time of reaching the next road section to a travel time selection model and a state data prediction model trained on historical data of the next road section; and continuing to determine the predicted time of reaching the next road section and predicting the travel time of the next road section until a travel time of each road section in the plurality of road sections is determined.

16. The storage medium according to claim 15, wherein the predicting the travel time of the first road section further comprises:

inputting the first state data to the travel time selection model trained on the historical data of the first road section, and determining the travel time of the first road section based on the travel time selection model trained on the historical data of the first road section.

17. The storage medium according to claim 15, wherein the predicting the travel time of the first road section further comprises:

inputting the first state data to the travel time selection model trained on the historical data of the first road section, determining probabilities of a plurality of travel times based on the travel time selection model trained on the historical data of the first road section, and selecting a plurality of alternative travel times of the first road section from the plurality of travel times according to the probabilities of the plurality of travel times; and the predicting the travel time of the next road section further comprises:

inputting, for each alternative travel time of the first road section, the first state data and the alternative travel time to the state data prediction model trained on the historical data of a second road section after the first road section, and determining, based on the state data prediction model trained on historical data of the second road section, alternative state data of the second road section after the first road section is traveled through according to the alternative travel time under the first state data.

18. The storage medium according to claim 17, wherein determining the travel time of the first road section further comprises:

inputting the alternative state data corresponding to each alternative travel time to a payoff value prediction model, obtaining a payoff value of each alternative state data based on the payoff value prediction model, the payoff value being used for measuring prediction accuracy of the corresponding state data;

selecting, from the alternative state data corresponding to the plurality of alternative travel times, alternative state data having a maximum payoff value, and determining the selected alternative state data as second state data of the second road section; and determining the alternative travel time corresponding to the second state data as the travel time of the first road section.

19. The storage medium according to claim 15, wherein:

state data of each road section of the to-be-traveled route includes a real-time travel speed of the respective road section, the state data prediction model trained on historical data of the first road section includes a first speed prediction model, and the operations further comprising:

predicting the travel time of the first road section according to the first state data based on the travel time selection model and the state data prediction model trained on historical data of the first road section;

determining, according to a current time point and a travel time of each road section before the first road section, a first time point of reaching a start point of the first road section, and obtaining a real-time travel speed of the first road section at the first time point; and inputting the real-time travel speed of the first road section at the first time point and the predicted travel time of the first road section to the first speed prediction model, and determining a real-time travel speed of a second road section following the first road section at a second time point based on the first speed prediction model, the second time point being determined according to the first time point and the predicted travel time.

* * * * *